(12) United States Patent
Katpelly et al.

(10) Patent No.: US 8,478,295 B1
(45) Date of Patent: Jul. 2, 2013

(54) SYSTEMS AND METHODS FOR ASSOCIATING COMMUNICATION INFORMATION WITH A GEOGRAPHIC LOCATION-AWARE CONTACT ENTRY

(75) Inventors: Ravi Reddy Katpelly, Cary, NC (US); Kunal Kandekar, Jersey City, NJ (US); Scott Curtis, Durham, NC (US)

(73) Assignee: Modena Enterprises, LLC, Wilmington, DE (US)

(*) Notice: Subject to any disclaimer, the term of this patent is extended or adjusted under 35 U.S.C. 154(b) by 0 days.

(21) Appl. No.: 13/476,229

(22) Filed: May 21, 2012

Related U.S. Application Data

(63) Continuation of application No. 12/835,786, filed on Jul. 14, 2010, now Pat. No. 8,185,132.

(60) Provisional application No. 61/227,215, filed on Jul. 21, 2009.

(51) Int. Cl.
*H04W 24/00* (2009.01)

(52) U.S. Cl.
USPC .................. 455/456.1; 455/415; 379/375.01

(58) Field of Classification Search
USPC .................. 455/414.1–418, 445, 456.1–457, 455/563, 412, 422, 566; 379/230, 114, 142, 379/88
See application file for complete search history.

(56) References Cited

U.S. PATENT DOCUMENTS

| | | | |
|---|---|---|---|
| 5,550,907 A | 8/1996 | Carlsen | |
| 5,565,909 A | 10/1996 | Thibadeau et al. | |
| 5,577,041 A | 11/1996 | Sharma et al. | |
| 6,011,975 A * | 1/2000 | Emery et al. | 455/456.1 |
| 6,278,704 B1 | 8/2001 | Creamer et al. | |
| 6,314,296 B1 | 11/2001 | Hamada et al. | |
| 6,366,856 B1 | 4/2002 | Johnson | |
| 6,724,872 B1 | 4/2004 | Moore et al. | |
| 6,978,003 B1 | 12/2005 | Sylvain | |
| 6,992,584 B2 | 1/2006 | Dooley et al. | |
| 7,043,362 B2 | 5/2006 | Krull et al. | |
| 7,046,994 B1 * | 5/2006 | Padawer et al. | 455/415 |
| 7,047,019 B1 * | 5/2006 | Cox et al. | 455/456.1 |
| 7,054,621 B2 | 5/2006 | Kennedy | |

(Continued)

FOREIGN PATENT DOCUMENTS

| | | |
|---|---|---|
| EP | 1923830 A2 | 5/2008 |
| JP | 2004118853 A | 4/2004 |

(Continued)

OTHER PUBLICATIONS

Audet, F. et al., "Extended REFER," Slides from International Engineering Task Force (IETF), 59th Meeting, Feb. 29-Mar. 5, 2004, Seoul, South Korea, found at <http://www.softarmor.com/sipping/meets/ietf59/slides/>, 13 pages.

(Continued)

*Primary Examiner* — Kashif Siddiqui
(74) *Attorney, Agent, or Firm* — Olive Law Group, PLLC

(57) ABSTRACT

Disclosed herein are systems and methods for associating communication information with a geographic location-aware contact entry. According to embodiments of the present disclosure, a method may include identifying a geographic location. The method may also include receiving a communication including identification information and originating from the geographic location. Further, the method may include associating the identification information with a contact entry.

27 Claims, 11 Drawing Sheets

U.S. PATENT DOCUMENTS

| | | | |
|---|---|---|---|
| 7,068,768 B2 | 6/2006 | Barnes | |
| 7,085,578 B2 | 8/2006 | Barclay et al. | |
| 7,096,009 B2 | 8/2006 | Mousseau et al. | |
| 7,120,455 B1 | 10/2006 | Chen et al. | |
| 7,139,797 B1 | 11/2006 | Yoakum et al. | |
| 7,143,214 B2 | 11/2006 | Hayes et al. | |
| 7,184,523 B2 | 2/2007 | Dixit et al. | |
| 7,196,630 B2 | 3/2007 | Baker | |
| 7,212,111 B2 | 5/2007 | Tupler et al. | |
| 7,215,750 B2 | 5/2007 | Nguyen et al. | |
| 7,231,428 B2* | 6/2007 | Teague | 709/206 |
| 7,248,677 B2 | 7/2007 | Randall et al. | |
| 7,269,413 B2* | 9/2007 | Kraft | 455/415 |
| 7,330,721 B2 | 2/2008 | Bhatia et al. | |
| 7,346,668 B2 | 3/2008 | Willis | |
| 7,440,900 B2 | 10/2008 | Chang | |
| 7,487,190 B2 | 2/2009 | Black et al. | |
| 7,526,306 B2 | 4/2009 | Brems et al. | |
| 7,529,540 B2 | 5/2009 | Cox et al. | |
| 7,542,558 B2 | 6/2009 | Klein et al. | |
| 7,548,756 B2 | 6/2009 | Velthuis et al. | |
| 7,640,293 B2 | 12/2009 | Wilson et al. | |
| 7,796,998 B1 | 9/2010 | Zellner et al. | |
| 7,953,447 B2* | 5/2011 | Shostak | 455/563 |
| 8,036,356 B1* | 10/2011 | Ghosh et al. | 379/142.1 |
| 8,185,132 B1 | 5/2012 | Katpelly et al. | |
| 2001/0028703 A1* | 10/2001 | Katseff et al. | 379/88.18 |
| 2002/0055088 A1 | 5/2002 | Feig | |
| 2002/0098844 A1* | 7/2002 | Friedenfelds et al. | 455/445 |
| 2002/0172339 A1 | 11/2002 | Creswell et al. | |
| 2003/0050984 A1 | 3/2003 | Pickup et al. | |
| 2003/0112928 A1* | 6/2003 | Brown et al. | 379/67.1 |
| 2003/0119495 A1* | 6/2003 | Hanninen et al. | 455/422 |
| 2003/0147518 A1 | 8/2003 | Albal et al. | |
| 2003/0152206 A1 | 8/2003 | Kawaguchi et al. | |
| 2003/0182052 A1 | 9/2003 | DeLorme et al. | |
| 2003/0229717 A1* | 12/2003 | Teague | 709/246 |
| 2004/0066920 A1* | 4/2004 | Vandermeijden | 379/88.19 |
| 2004/0157562 A1 | 8/2004 | Ovaskainen et al. | |
| 2004/0186848 A1* | 9/2004 | Kobashikawa et al. | 707/102 |
| 2005/0033811 A1 | 2/2005 | Bhogal et al. | |
| 2005/0202781 A1 | 9/2005 | Steelberg et al. | |
| 2005/0272448 A1* | 12/2005 | Tran et al. | 455/456.6 |
| 2006/0034441 A1 | 2/2006 | Kraft | |
| 2006/0052116 A1 | 3/2006 | Bhogal et al. | |
| 2006/0064739 A1 | 3/2006 | Guthrie et al. | |
| 2006/0128411 A1 | 6/2006 | Turcanu | |
| 2006/0153349 A1 | 7/2006 | Brun et al. | |
| 2006/0171523 A1 | 8/2006 | Greenwell | |
| 2006/0199567 A1* | 9/2006 | Alston | 455/412.1 |
| 2006/0200490 A1 | 9/2006 | Abbiss | |
| 2006/0215823 A1* | 9/2006 | Gruchala et al. | 379/93.24 |
| 2006/0247853 A1* | 11/2006 | Jung et al. | 701/209 |
| 2007/0036316 A1 | 2/2007 | Croak et al. | |
| 2007/0091878 A1 | 4/2007 | Croak et al. | |
| 2007/0117552 A1 | 5/2007 | Gobburu et al. | |
| 2007/0135110 A1 | 6/2007 | Athale et al. | |
| 2007/0197233 A1* | 8/2007 | Feng | 455/456.4 |
| 2007/0243880 A1 | 10/2007 | Gits et al. | |
| 2007/0249327 A1 | 10/2007 | Nurmi | |
| 2007/0260725 A1 | 11/2007 | McCuller | |
| 2007/0266097 A1 | 11/2007 | Harik et al. | |
| 2007/0281689 A1 | 12/2007 | Altman et al. | |
| 2008/0125106 A1 | 5/2008 | Lee et al. | |
| 2008/0214148 A1 | 9/2008 | Ramer et al. | |
| 2008/0250066 A1* | 10/2008 | Ekstrand et al. | 707/104.1 |
| 2008/0304637 A1* | 12/2008 | Ganganna | 379/88.23 |
| 2009/0034696 A1 | 2/2009 | Ramanathan | |
| 2009/0063154 A1 | 3/2009 | Gusikhin et al. | |
| 2009/0086947 A1* | 4/2009 | Vendrow | 379/201.12 |
| 2009/0104895 A1 | 4/2009 | Kasturi et al. | |
| 2009/0124243 A1* | 5/2009 | Routley et al. | 455/418 |
| 2009/0186629 A1* | 7/2009 | Soelberg et al. | 455/456.1 |
| 2009/0197621 A1* | 8/2009 | Book | 455/457 |
| 2009/0215486 A1 | 8/2009 | Batni et al. | |
| 2009/0216775 A1 | 8/2009 | Ratliff et al. | |
| 2009/0219921 A1 | 9/2009 | Beinroth et al. | |
| 2009/0225968 A1 | 9/2009 | Paranjape et al. | |
| 2009/0275307 A1 | 11/2009 | Kahn | |
| 2009/0311999 A1* | 12/2009 | Sarkar et al. | 455/415 |
| 2009/0316951 A1 | 12/2009 | Soderstrom | |
| 2010/0130213 A1* | 5/2010 | Vendrow et al. | 455/445 |
| 2010/0149306 A1 | 6/2010 | Gopal et al. | |
| 2010/0228560 A1* | 9/2010 | Balasaygun et al. | 705/1.1 |
| 2010/0316205 A1* | 12/2010 | Zheng et al. | 379/142.1 |
| 2010/0317341 A1* | 12/2010 | Ferren | 455/426.1 |
| 2011/0034156 A1* | 2/2011 | Gatti et al. | 455/415 |
| 2011/0212712 A1 | 9/2011 | Abdel-Kader | |
| 2012/0134321 A1 | 5/2012 | Amidon et al. | |
| 2012/0135716 A1 | 5/2012 | Katpelly et al. | |
| 2012/0135718 A1 | 5/2012 | Amidon et al. | |
| 2012/0135744 A1 | 5/2012 | Curtis et al. | |
| 2012/0136529 A1 | 5/2012 | Curtis et al. | |
| 2012/0136942 A1 | 5/2012 | Amidon et al. | |

FOREIGN PATENT DOCUMENTS

| | | |
|---|---|---|
| JP | 2004205443 A | 7/2004 |
| JP | 2007079945 A | 3/2007 |
| TW | 262408 B | 9/2006 |
| WO | 01/31964 A1 | 5/2001 |
| WO | 01/58165 A2 | 8/2001 |
| WO | 02/11407 A2 | 2/2002 |
| WO | 2006/075853 A1 | 7/2006 |
| WO | 2009/022446 A1 | 2/2009 |

OTHER PUBLICATIONS

Campbell, A. T. and Choudhury, T., "Toward Societal Scale Sensing using Mobile Phones," white paper presented at the NSF Workshop on Future Directions in Networked Sensing Systems, Nov. 12-13, 2009, Arlington, Virginia, 1 page.

Campbell, A. T. et al., "CenceMe: Injecting Sensing Presence into Social Network Applications using Mobile Phones (Demo Abstract)," In Proc. of Ninth ACM International Symposium on Mobile Ad Hoc Networking and Computing. (MobiHoc '08), Hong Kong, May 27-30, 2008, 2 pages.

Campbell, A. T. et al., "CenceMe: Injecting Sensing Presence into Social Network Applications using Mobile Phones (Demo Abstract)," In Proc. of Ninth Workshop on Mobile Computing Systems and Applications (HotMobile 2008), Napa Valley, California, Feb. 25-26, 2008, 1 page.

Campbell, Andrew T. et al., "Demo Abstract: Transforming the Social Networking Experience with Sensing Presence from Mobile Phones," SenSys'08, Nov. 5-7, 2008, Raleigh, North Carolina, 2 pages.

Campbell, Andrew T. et al., "People-Centric Urban Sensing," In Proc. of Second ACM/IEEE Annual International Wireless Internet Conference (WICON 2006), Boston, Massachusetts, Aug. 2-5, 2006, 14 pages.

Campbell, Andrew T. et al., "The Rise of People-Centric Sensing," IEEE internet Computing, Jul./Aug. 2008, published by the IEEE Computer Society, copyright 2008, IEEE, pp. 12-21, 10 pages.

"cellity Address book 2.0," Presentation, Mobile Media Summit, Medienforum nrw, Koln, Jun. 24, 2009, cellity AG, Hamburg, Germany, 18 pages.

"City to showcase Typetalk phone system for deaf," NEWS.scotsman.com, at <http://news.scotsman.com/health/City-to-showcase--Typetalk.4755272.jp>, updated on Dec. 3, 2008, printed May 2, 2011, 2 pages.

Eisenman, S. and Campbell, A., "E-CSMA: Supporting Enhanced CSMA Performance in Experimental Sensor Networks using Per-neighbor Transmission Probability Thresholds," In Proc. of IEEE INFOCOM 2007, Anchorage, Alaska, May 6-12, 2007, 9 pages.

Eisenman, S. B. and Campbell, A. T., "Structuring Contention-based Channel Access in Wireless Sensor Networks," IPSN'06, Apr. 19-21, 2006, Nashville, Tennessee, copyright 2006, ACM, 9 pages.

Eisenman, S. B. et al., "The BikeNet Mobile Sensing System for Cyclist Experience Mapping," SenSys '07, Nov. 6-9, 2007, Sydney, Australia, copyright 2007, ACM, 15 pages.

Eisenman, Shane B. et al., "BikeNet: A Mobile Sensing System for Cyclist Experience Mapping," ACM Transactions on Sensor Networks, vol. 6, No. 1, Article 6, Dec. 2009, copyright 2009, ACM, 39 pages.

Eisenman, Shane B. et al., "MetroSense Project: People-Centric Sensing at Scale," WSW'06 at SenSys '06, Oct. 31, 2006, Boulder, Colorado, copyright 2006, ACM, 6 pages.

Eisenman, Shane B. et al., "Techniques for Improving Opportunistic Sensor Networking Performance," In Proc. of International Conference on Distributed Computing in Sensor Networks (DCOSS 2008), Santorini Island, Greece, Jun. 11-14, 2008, 20 pages.

"Ensure calls are never missed with SwyxWare Extended Call Routing," SAS.UK, originally found at <http://www.sas-uk.net/Swyx-Extended-Call-Routing.htm>, found at Internet Archive, dated May 9, 2008, printed May 2, 2011, 1 page.

Fallon, Sean, "Tame Cube Concept: A Good Excuse is Just a Roll Away," Apr. 10, 2008, at <http://gizmodo.com/378514/tame-cube-concept-a-good-excuse-is-just-a-roll-away>, printed Oct. 13, 2011, 2 pages.

Forrest, Brady, "iPhone's Location-Aware Apps," O'Reilly Radar, Jul. 14, 2008, copyright 2005-2009, O'Reilly Media, Inc., Internet publication, at <http://radar.oreilly.com/2008/07/iphone-location-aware-apps.html>, printed Sep. 15, 2009, 3 pages.

"Free Long Distance Calls via Google Maps," article published on Feb. 21, 2007, at <http://www.fivecentnickel.com/2007/02/21/free-long-distance-calls-via-google-maps>, copyright 2005-2008, PlanetB Media, LLC, printed Nov. 11, 2008, 7 pages.

"G-Park," PosiMotion website, at <http://www.posimotion.com/index.php?go=applications&option=view&entry=1>, copyright 2007-2009, PosiMotion LLC, 2 pages.

"GeoWhitePages," dated Aug. 6, 2006, at <http://babasave.wordpress.com/2006/08/06/geowhitepages>, printed Nov. 11, 2008, 3 pages.

"Gizmo5," Wikipedia, found at <http://en.wikipedia.org/wiki/Gizmo5> on Internet Archive, last modified May 31, 2008, captured Jun. 13, 2008, printed Nov. 11, 2011, 2 pages.

"Google Maps Mania: Google Maps US/Canada Phone Book Mashups," dated Jun. 9, 2006, posted by Mike Pegg, at <http://googlemapsmania.blogspot.com/2006/06/google-maps-uscanada-phone-book.html>, printed Nov. 11, 2008, 1 page.

"Google PhoneBook," at <http://snopes.com/computer/internet/google.asp>, last updated Feb. 21, 2005, copyright 1995-2008, snopes.com, printed Nov. 11, 2008, 2 pages.

"Google Stalk," at <http://shinyplasticbag.com/projects/stalk>, available on the Internet Archive as of Jan. 4, 2006, printed Nov. 11, 2008, 1 page.

"GrandCentral," Wikipedia, found at <http://en.wikipedia.org/wiki/GrandCentral> on Internet Archive, last modified Aug. 8, 2008, captured Aug. 10, 2008, printed Nov. 11, 2011, 2 pages.

"IBM WebSphere Presence Server," IBM Data Sheet, Dec. 2007, IBM Corporation, found at ftp://public.dhe.ibm.com/software/pervasive/presenceserver/Presence_6_2_DS_Final.pdf, 4 pages.

"Ifbyphone: IVR Solutions, Click to Call, Voice Broadcast, Call Routing," originally found at <http://public.ifbyphone.com/>, archived copy dated Jul. 2, 2008, found using the Internet Archive, copyright 2008, ifbyphone, printed Apr. 27, 2011, 4 pages.

Kaowthumrong, K. et al., "Automated Selection of the Active Device in Interactive Multi-Device Smart Spaces," in Workshop at UbiComp'02: Supporting Spontaneous Interaction in Ubiquitous Computing Settings,Goteborg, Sweden, Sep. 29-Oct. 1, 2002, 6 pages.

Koumpis, K. and Renals, S., "The Role of Prosody in a Voicemail Summarization System," In Proc. International Speech Communication Association (ISCA) Workshop on Prosody in Speech Recognition and Understanding, Red Bank, NJ, Oct. 22-24, 2001, pp. 87-92, 6 pages.

Lane, Nicholas D. et al., "Ambient Beacon Localization: Using Sensed Characteristics of the Physical World to Localize Mobile Sensors," EmNets'07, Jun. 25-26, 2007, Cork, Ireland, copyright 2007, ACM, 5 pages.

Lane, Nicholas D. et al., "Cooperative Techniques Supporting Sensor-based People-centric Inferencing," In Proc. of Sixth International Conference on Pervasive Computing, Sydney, Australia, May 19-22, 2008, 18 pages.

Lane, Nicholas D. et al., "The Influence of Microprocessor Instructions on the Energy Consumption of Wireless Sensor Networks," In Proc. of Third Workshop on Embedded Networked Sensors (EmNets 2006), pp. 41-45, May 30-31, 2006, Cambridge, Massachusetts, 5 pages.

Lane, Nicholas D. et al., "Urban Sensing: Opportunistic or Participatory?," In Proc. of Ninth Workshop on Mobile Computing Systems and Applications (HotMobile 2008), Feb. 25-26, 2008, Napa Valley, California, 6 pages.

Lane, Nicholas D. et al., "Urban Sensing: Opportunistic or Participatory?," In Proc. of First Workshop Sensing on Everyday Mobile Phones in Support of Participatory Research, Nov. 6, 2007, Sydney, Australia, 1 page.

Lee, S.-B. et al., "Solicitation-based Forwarding for Sensor Networks," In Proc. of Third Annual IEEE Conf. on Sensor, Mesh and Ad Hoc Communications and Networks (SECON 2006), Reston, Virginia, Sep. 25-28, 2006, 10 pages.

Lu, H. et al., "SoundSense: Scalable Sound Sensing for People-Centric Applications on Mobile Phones," MobiSys'09, Jun. 22-25, 2009, Krakow, Poland, copyright 2009, ACM, 14 pages.

Lu, Hong et al., "Bubble-Sensing: A New Paradigm for Binding a Sensing Task to the Physical World using Mobile Phones," In Intl. Workshop on Mobile Devices and Urban Sensing, St. Louis, Missouri, Apr. 21, 2008, 7 pages.

Messner, Richard A., "An Integrated Command Control and Communications Center for First Responders," Department of Electrical and Computer Engineering, University of New Hampshire, Durham, New Hampshire, 2005, found at <http://www.ece.unh.edu/svpal/Papers/2005%20SPIE%20Paper.pdf>, 14 pages.

"Method and System to Precisely Identify and Notify Callee's Status in Cellular Phone," at <http://priorartdatabase.com/IPCOM/000175628>, Oct. 16, 2008, 3 pages.

Milewski, Allen E. and Smith, Thomas M., "Providing Presence Cues to Telephone Users," AT&T Labs, Research, Oct. 3, 2000, at <http://web.mitedu/bentley/www/mobile/papers/presencecues.pdf>, 9 pages.

Miluzzo, E. et al., "CaliBree: A Self-calibration System for Mobile Sensor Networks," S. Nikoletseas et al. (Eds.), DCOSS 2008, LNCS 5067, copyright 2008, Springer-Verlag Berlin Heidelberg, pp. 314-331, 18 pages.

Miluzzo, E. et al., "CenceMe—Injecting Sensing Presence into Social Networking Applications," G. Kortuem et al., (Eds.), EuroSSC, 2007, LNCS 4793, pp. 1-28, copyright 2007, Springer-Verlag Berlin Heidelberg, 28 pages.

Miluzzo, E. et al., "Evaluating the iPhone as a Mobile Platform for People-Centric Sensing Applications," UrbanSense08, Nov. 4, 2008, Raleigh, North Carolina, pp. 41-45.

Miluzzo, E. et al., "Poster Abstract: Virtual Sensing Range," SenSys'06, Nov. 1-3, 2006, Boulder, Colorado, copyright 2006, ACM, 2 pages.

Miluzzo, E. et al., "Radio Characterization of 802.15.4 and Its Impact on the Design of Mobile Sensor Networks," R. Verdone (Ed.), EWSN 2008, LNCS 4913, pp. 171-188, copyright 2008, Springer-Verlag Berlin Heidelberg, 18 pages.

Miluzzo, E. et al., "Sensing Meets Mobile Social Networks: The Design, Implementation and Evaluation of the CenceMe Application," SenSys'08, Nov. 5-7, 2008, Raleigh, North Carolina, pp. 337-350, copyright 2008, ACM, 14 pages.

Musolesi, M. et al., "The Second Life of a Sensor: Integrating Real-world Experience in Virtual Worlds using Mobile Phones," HotEmNets'08, Jun. 2-3, 2008, Charlottesville, Virginia, copyright 2008, ACM, 5 pages.

Nakanishi et al., "iCAMS: A Mobile Communication Tool Using Location and Schedule Information," PERVASIVE computing, published by IEEE CS and IEEE ComSoc, Jan.-Mar. 2004, pp. 82-88, copyright 2004, IEEE, 7 pages.

"Park-n Find 2.0—iPhone App Index," at <http://www.iphoneappindex.com/2009/11/19/parkn-find-2-0>, Nov. 19, 2009, copyright 2009, iPhone App Index, 8 pages.

"Polar Bear Farm—iPhone Apps," at <http://www2.polarbearfarm.com/telegram.html>, copyright 2008, Polar Bear Farm Ltd, printed Apr. 27, 2011, 2 pages.

Scotsman.com, "City to showcase Typetalk phone system for deaf," Dec. 3, 2008, at <http://www.scotsman.com/news/city_to_showcase_typetalk_phone_system_for_deaf_1_1280979>, printed Oct. 13, 2011, 1 page.

"slydial situations," originally found at <http://slydial.com/>, earliest archived copy dated Aug. 27, 2008, found using the Internet Archive, printed Apr. 27, 2011, 2 pages.

"Ultimate Android," Dec. 2009, 5 pages.

"User-Centric Implications | RebelVox Technology," User Benefits, found at <http://www.rebelvox.com/en/technology/user-benefits.php> on the Internet Archive, dated Mar. 1, 2009, copyright 2009, RebelVox, printed Nov. 11, 2011, 1 page.

Wan, C.-Y. et al., "Overload Traffic Management for Sensor Networks," ACM Transactions on Sensor Networks, vol. 3, No. 4, Article 18, Oct. 2007, copyright 2007, ACM, 38 pages.

* cited by examiner

SYSTEMS AND METHODS FOR ASSOCIATING COMMUNICATION INFORMATION WITH A GEOGRAPHIC LOCATION-AWARE CONTACT ENTRY

CROSS REFERENCE TO RELATED APPLICATIONS

This application is a continuation of U.S. utility patent application Ser. No. 12/835,786, filed Jul. 14, 2010 now U.S. Pat. No. 8,185,132 and titled SYSTEMS AND METHODS FOR ASSOCIATING COMMUNICATION INFORMATION WITH A GEOGRAPHIC LOCATION-AWARE CONTACT ENTRY, which claims the benefit of U.S. provisional patent application No. 61/227,215, filed Jul. 21, 2009 and titled ASSOCIATING CONTEXT-SPECIFIC INFORMATION FOR CALLS FROM A LOCATION, the content of which is hereby incorporated herein by reference in their entireties. This application is related to the U.S. utility patent application Ser. No. 12/835,779, filed Jul. 14, 2010 and titled SYSTEMS AND METHODS FOR ASSOCIATING CONTEXTUAL INFORMATION AND A CONTACT ENTRY WITH A COMMUNICATION ORIGINATING FROM A GEOGRAPHIC LOCATION, the content of which is hereby incorporated herein by reference in its entirety.

TECHNICAL FIELD

The present disclosure relates to systems and methods for associating communication information with a geographic location-aware contact entry.

BACKGROUND

Mobile devices having smart phone capabilities have become ubiquitous in today's society. Such computing devices can provide basic wireless telephone service and various other features available on desktop and laptop computers. Further, such computing devices are Internet-accessible and include highly efficient processors and display functionality for rendering rich graphical information that is available to be downloaded to the device over the Internet. These devices include personal information management (PIM) functions, such as address books, appointment calendars, and the like. In addition, these devices have the ability to handle multiple functions at once.

Oftentimes when a user receives a telephone call or other communication on a smart phone or another computing device, only limited information is presented to the user. For example, typically when a telephone call is received on a mobile device, the only information displayed to the user is a name of the caller and a time of receipt of the call. Accordingly, it is desirable to provide systems and methods for providing additional information to the user. It is also desirable to provide the user with an ability to have increased control over communications received at a computing device. Further, it is desirable to allow users to control address book contact entries based on computer device communications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for associating communication information with a geographic location-aware contact entry. According to embodiments of the present disclosure, a method may include identifying a geographic location. The method may also include receiving a communication including identification information and originating from the geographic location. Further, the method may include associating the identification information with a contact entry.

In accordance with other embodiments of the present disclosure, a method includes receiving a communication including information identifying a geographic location from where the communication originated. The method may also include selecting a contact entry based on the information identifying the geographic location. Further, the method may include presenting the selected contact entry to the user.

In accordance with other embodiments of the present disclosure, a method includes receiving a communication. The method also includes selecting a contact entry based on at least one of information contained in the communication and a context of receiving the communication. Further, the method may include presenting the selected contact entry to the user.

Receiving the communication may include receiving at least one of a telephone call, an email, a text message, and an instant message.

The contact entry may include at least one of a name, a physical address, a telephone number, and an email address.

The information contained in the communication may include a communication source identifier. Selecting the contact entry may include selecting the contact entry based on the communication source identifier. The method may also include assigning the contact entry to a contact group based on the communication source identifier.

The method may also include using the information contained in the communication to determine a characteristic of a source of the communication. Selecting the contact entry may include selecting the contact entry based on the determined characteristic.

Information contained in the communication may include voice data. Selecting the contact entry may include selecting the contact entry based on the voice data.

The communication includes at least one of a name, a physical address, a telephone number, and an email address. The method may also include adding the at least one of the name, the physical address, the telephone number, and the email address to the selected contact entry. The name, the physical address, the telephone number, and the email address may be automatically added to the selected contact entry.

The method may also include determining a time when the communication is received. Selecting the contact entry may include selecting the contact entry based on the determined time.

In accordance with other embodiments of the present disclosure, a method includes storing historical data of communications originating from a source. The method may also include receiving a communication originating from the source located at a geographic location. Further, the method may include determining whether at least one of the historical data and the geographic location meets a criterion. The method also includes applying a predefined process to the communication originating from the source located at the geographic location in response to determining that the criterion is met.

The communications originating from the source may include any of telephone calls, emails, text messages, and instant messages.

The historical data may include a time of receipt of each of the communications. Applying the predefined process may include notifying a user of the source of the time of receipt of each of the communications.

The historical data may include information indicating a number of times communications from the source originated from the geographic location. Determining whether at least one of the historical data and the geographic location meets the criterion may include determining whether the number of times communications from the source meets a threshold number. In response to determining that the number of communications from the source meets the threshold number, the predefined process may be applied. Further, the method may include associating the source with a contact entry in response to determining that the number of communications from the source meets the threshold number.

The method may also include determining a name associated with the geographic location based on a contact entry associated with the source. The name may be presented to a user in response to receiving the communication.

The historical data comprises a time of expected communications originating from the source at a second geographic location, wherein the first geographic location in the received communication is different than the second geographic location. Determining whether at least one of the historical data and the geographic location meets the criterion may include determining whether the communication originating from the source at the first geographic location is received within the time of expected communications. Applying the predefined process may include notifying a user of a name of the first geographic location in response to determining that the communication originating from the source at the first geographic location is received within the time of expected communications.

The method may also include determining a number of communications originating from the source at the first geographic location is received within the time of expected communications. Further, the method may include determining whether the number of communications meets a predetermined threshold. In response determining that the number of communications meets a predetermined threshold, a contact entry may be updated with a name of the first geographic location. Further, a user may be notified about receipt of the communication from the first geographic location.

The method may include notifying the user of a name associated with the first geographic location.

The method may include using the first geographic location to search a communications network for the name.

Applying the predefined process may include updating a contact entry associated with the source based on at least one of the historical data and the geographic location. The method may also include determining a confidence level for updating a contact entry with a name of the geographic location. Further, the method may include notifying a user of the confidence level for updating the contact entry.

In accordance with other embodiments of the present disclosure, a method includes receiving a communication including identification information and originating from a geographic location. The method may also include selecting a contact entry based on the identification information. Further, the method may include associating the geographic location with the contact entry.

Receiving the communication may include receiving the communication from a source at the geographic location.

Associating the geographic location with the contact entry may include automatically associating the geographic location with the contact entry.

The method may also include presenting an option for a user to associate the geographic location with the contact entry. Further, the method may include receiving user input selecting the option for associating the geographic location with the contact entry.

The method may also include presenting an option for a user to name the geographic location. Further, the method may include receiving user input for naming the geographic location.

Further, the method may include analyzing at least one of contents of the communication and a context of receipt of the communication. The method may also include automatically associating the geographic location with the communication based on the analysis.

The method may also include determining a physical address of the geographic location based on contents of the communication.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
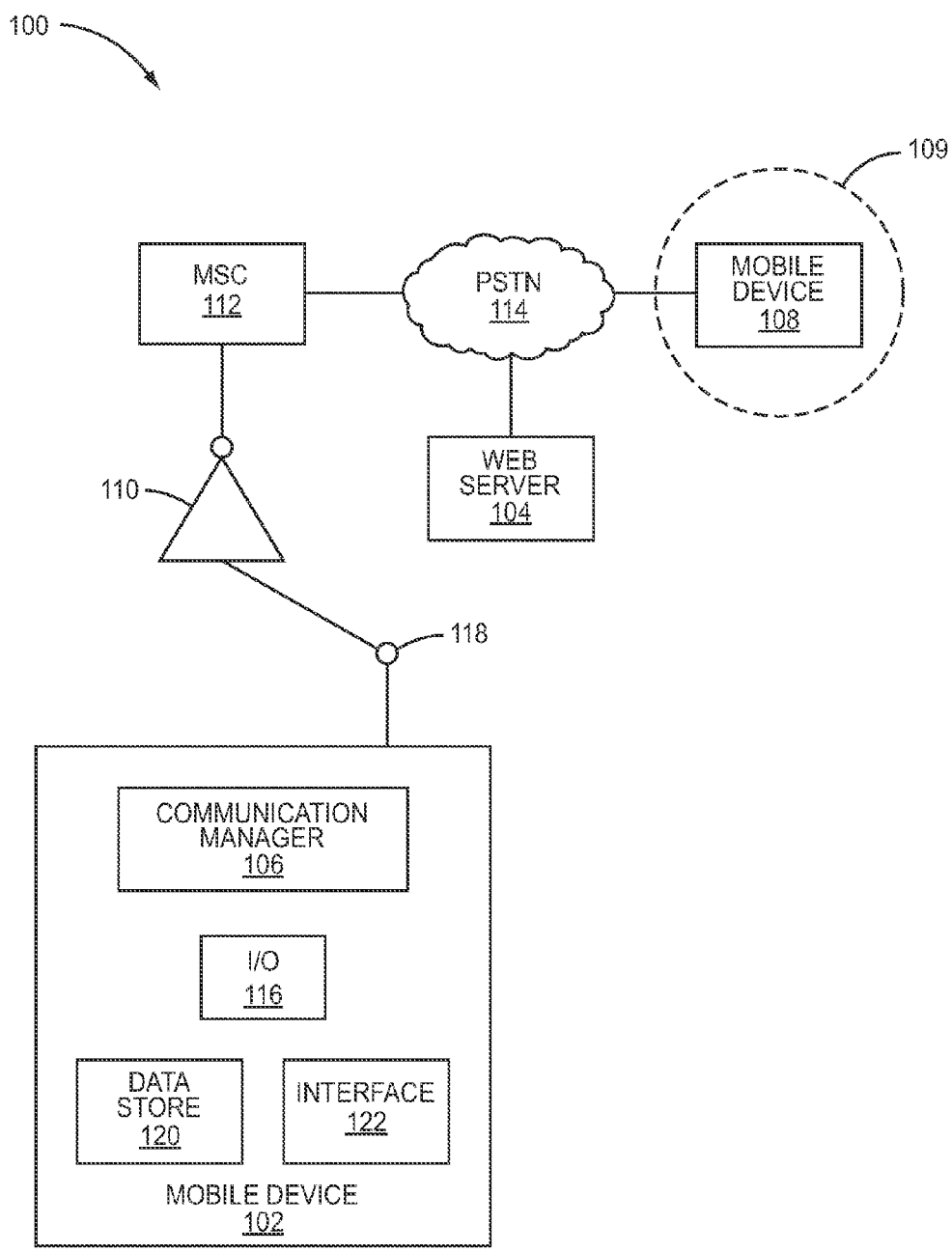
FIG. 1 is a schematic diagram of a system for associating contextual information with data identifying a geographic location, receiving communications originating from the geographic location, and presenting the contextual information to a user in response to receiving communications from the geographic location according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable a computing device to associate contextual information with data identifying a geographic location, to receive communications originating from the geographic location, and to present the contextual information to a computing device user in response to receiving communications originating from the geographic location. Other embodiments of the present disclosure enable a user to create location-aware or context-aware contact entries on a computing device. Further, other embodiments enable a user to implement other features of the presently disclosed subject matter in a computing device as will be described in further detail herein.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the presently disclosed subject matter may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or the proposed 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the presently disclosed subject matter may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store.

Associating Contextual Information with Communications Originating from a Specified Geographic Location The presently disclosed subject matter is now described in more detail. For example, FIG. 1 is a schematic diagram of a system 100 for associating contextual information with data identifying a geographic location, receiving communications originating from the geographic location, and presenting the contextual information to a user in response to receiving communications originating from the geographic location according to embodiments of the present disclosure. Referring to FIG. 1, the system 100 includes a mobile device 102, which may be any type of computing device capable of receiving communications from another device. The mobile device 102 comprises a number of functional components. This representation of the mobile device 102 is meant to be for convenience of illustration and description, and it should not be taken to limit the scope of the presently disclosed subject matter as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile device 102 may include a graphics rendering engine for displaying information to the end user in the usual manner. The mobile device 102 is Internet-accessible and can interact with a web server 104 using known Internet protocols such as HTTP, HTTPS, and the like. The web server 104 is shown as a single device but this is not a requirement either; one or more programs, processes, or other code may comprise the server and be executed on one or more machines (in one or more networked locations).

The operation of the system can be described by the following example. As shown in FIG. 1, the mobile device 102 includes various functional components and associated data stores to facilitate the operation. The operation of the disclosed methods may be implemented using system components other than as shown in FIG. 1.

In this example system, the mobile device 102 includes a communication manager 106 configured to associate contextual information with data identifying a geographic location. For example, the contextual information may comprise user-specified information, automatically generated data, data generated based on an incoming communication, or a combination thereof. Examples of contextual information include, but are not limited to, text, video data, audio data, image data, and combinations thereof. The contextual information can include any self-descriptive information that a user wants to associate with or tag to a geographic location, such that when a communication is received from that originated from the geographic location, the contextual information is displayed or otherwise presented to the user. The contextual information may serve as a reminder to help the user to identify the context of the communication. The contextual information may be provided by one or more of several means, such as manual text input, audio recording of voice memos or conversations at the location, images or videos captured at the location, text generated via speech recognition and semantic analysis of recorded audio and video, and so on. The communication manager 106 may also be configured to implement other functions described herein according to embodiments of the present disclosure.

The communication manager 106 may be one or more modules implemented with software and/or hardware configured to establish and to receive communications (e.g., telephone calls), as well as other functions described herein. For ease of illustration, the communication manager 106 is only graphically shown in FIG. 1 as a single component of the mobile device 102. In an example of a communication, a telephone call can be established between the mobile device 102 and another device (e.g., mobile device 108) when a call is initiated at the mobile device 102 (e.g., when a user of the mobile device 102 dials the phone number of the other device), or when the mobile device 102 receives a call originating from the other device (e.g., mobile device 108) at a geographic location (e.g., geographic location 109). Once the call is answered at the receiving end, the call is considered to be established. The telephone call link can be implemented via suitable network components, such as, but not limited to, a base station 110, an MSC 112, PSTN 114, and various other network components, which are not shown herein for ease of illustration. A wireless input/output (I/O) component 116 or any other suitable communication interface may be used for communicating data to other devices and for receiving communication data from other devices via a network as will be understood to those of skill in the art. The mobile device 102 may include an antenna 118 for wirelessly sending and receiving communications to the base station 110 or any other suitable communications unit.

On receipt of communications from other devices or during communications with other devices, the communication manager 106 of the mobile device 102 may use contextual information or information contained in the communication for implementing processes or functions at the mobile device 102. The information may be stored in a data store 120, which can be any suitable type of memory. The user may use an interface 122 of the mobile device 102 for interacting with the mobile device.

Contextual information may include location-specific information tagged to a particular geographic location. For example, a user may open an application on a mobile device while he or she is present at the geographic location, and record any desired information specific to that location. Information that is recorded may include, for example, a topic of discussion, a purpose of visiting that location, when last met, and the like. In another example, the mobile device may automatically tag all of the user-provided information to that geographic location while the user is at the geographic location. In this example, user presence may be required at the geographic location for which the contextual information is tagged. The user may also create communication rules for filtering information. When a communication is received that originated from the geographic location, the mobile device may display or otherwise present the user-tagged information to the user. In addition, typical source information may be displayed, such as, for example, a caller identifier or a telephone number.

Data identifying a geographic location may be specified by the user or generated in response to user input. For example, the data identifying a geographic location may include, but is not limited to, coordinates defining a geographic location, a land area, an address, a name of the venue, and the like. A display of the mobile device 102 may display a graphical representation of the geographic location, such as with a graphical map.

According to embodiments of the present disclosure, a user of the mobile device 102 may use an application (often referred to as an "app") residing on the mobile device 102 to interact with the communication manager 106 via the interface 122 for associating the contextual information with data identifying the geographic location. The application may reside on the mobile device 102 and may be a part of the communication manager 106. The user may, for example, input commands into the interface 122 for selecting an icon to initialize the application. The application may have been downloaded from a web server, such as a server 104, and installed on the mobile device 102 in any suitable manner. The application may be downloaded to another machine (such as the mobile phone user's PC) and then transferred to the mobile device over a medium such as a Bluetooth connection. In an example, the application can enable the mobile device 102 with one or more of the features according to embodiments of the present disclosure.

After initialization of the application, the communications manager 106 may control the user interface 122 to present prompts for a user to input commands for associating contextual information with data identifying a geographic location. For example, a user may be presented with one or more icons, buttons, text, maps, audio, and/or other graphical information for aiding the user with identifying a geographic location, contextual information, and/or communication rules for associating contextual information with data identifying a geographic location. The user may use the interface 122 to select icons, enter text or other types of data, interact with a graphical map, and the like for inputting the commands.

Figure 2:
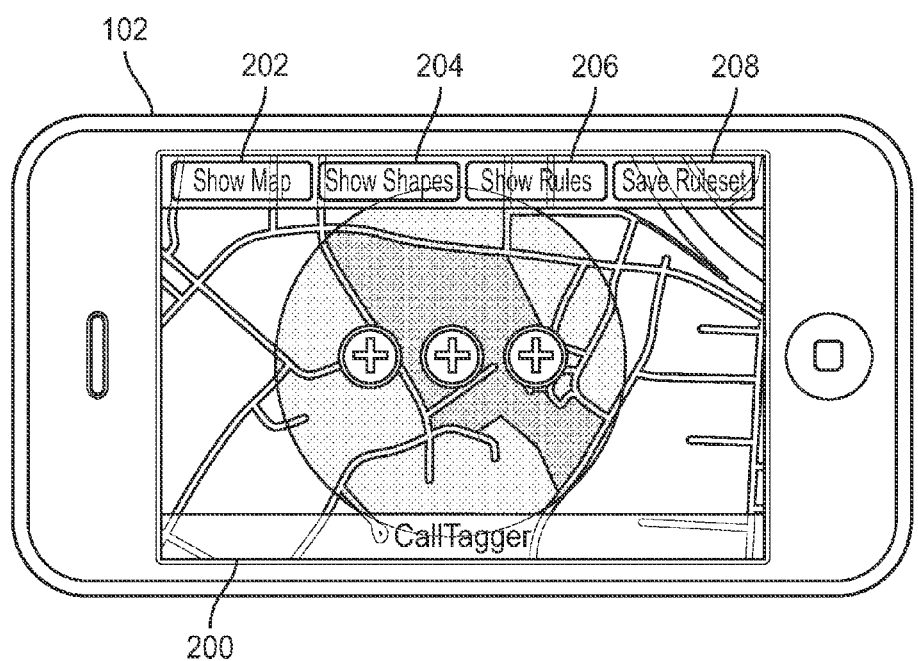
FIG. 2 is a front view of an exemplary mobile device including a touch screen display for displaying prompts for a user to input commands for associating contextual information with data identifying a geographic location according to embodiments of the present disclosure.

As an example, FIG. 2 illustrates a front view of an exemplary mobile device 102 including a touch screen display 200 for displaying prompts for a user to input commands for associating contextual information with data identifying a geographic location. Referring to FIG. 2, the touch screen 200 is configured to display text and graphics and to receive touch commands from the user. The touch screen display 200 displays a "Show Map" button 202, a "Show Shapes" button 204, and a "Show Rules" button 206, and a "Save Ruleset" button 208. The user may touch one of the buttons for selecting a function or feature assigned to the button.

Figure 3:
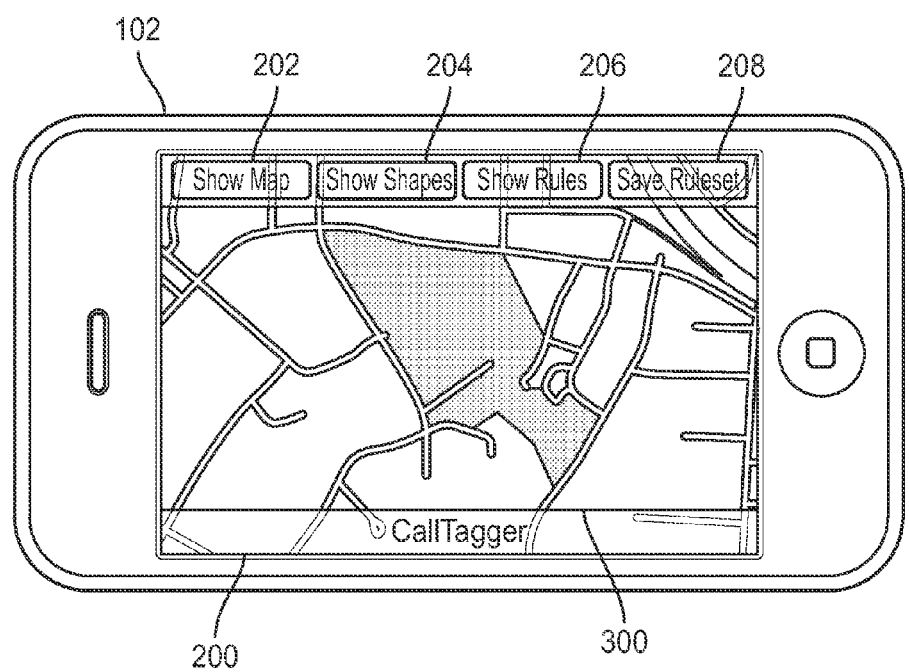
FIG. 3 is a front view of an exemplary mobile device displaying a graphical map with which the user may interact to identify a geographic location according to embodiments of the present disclosure.

The "Show Map" button 202 may be touched for initiating a function to display a graphical map with which the user may interact to identify a geographic location. For example, FIG. 3 illustrates a front view of the mobile device 102 displaying a graphical map 300 with which the user may interact to identify a geographic location according to embodiments of the present disclosure. Referring to FIG. 3, the graphical map 300 may be displayed after selection of the "Show Map" button 202. The graphical map 300 may show varying details of information about a geographic location that is currently being displayed. Although a street level view of a geographic location is shown in FIG. 3, the mobile device 102 may show additional details, including street address numbers, buildings, landmarks, and the like. Such levels of additional details may be obtained by selectively zooming into a particular area of the displayed geographic location or otherwise selecting a particular area for additional details as will be understood by those of skill in the art. The graphical map may also zoom out from a currently displayed geographic area to display less detail but greater geographic area. In addition, as will be understood by those of skill in the art, a user may provide input commands for displaying other geographic locations such as, for example, by moving the map to geographic locations adjacent the currently displayed geographic location, by entering coordinates for centering the map, and the like.

Figure 4:
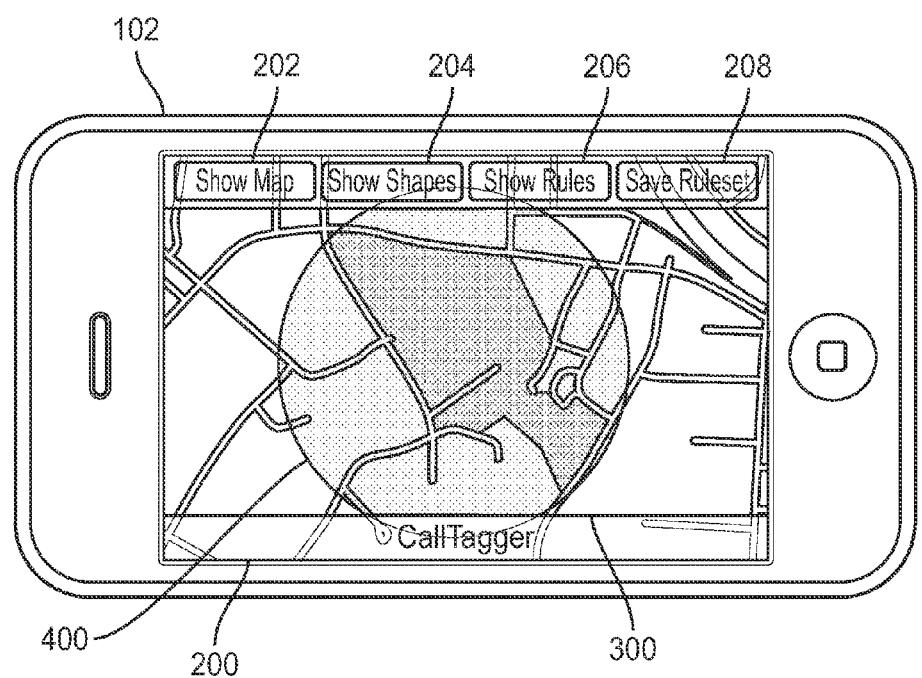
FIG. 4 is a front view of an exemplary mobile device displaying a graphical map and a user-selected shape for representing a geographic location on the graphical map in accordance with embodiments of the present disclosure.

The user may interact with a displayed graphical map for specifying a geographic location. The graphical map may include a representation of the geographic location, which may be selected by the user. A user-specified geographic location may be defined by one or more shapes of any size, which may also be specified by the user. In accordance with embodiments of the present disclosure, a geographic location may be specified by selecting one or more shapes, positioning the shape(s) on a graphical map, and sizing the shape(s) such that the shapes define a desired geographic location. For example, FIG. 4 illustrates a front view of the mobile device 102 displaying the graphical map 300 and a user-selected shape 400 for defining or representing a geographic location on the graphical map 300 in accordance with embodiments of the present disclosure. Referring to FIG. 4, the user may select the "Show Shapes" button 204 for displaying a menu of various shapes for selection by the user. Exemplary shapes include, but are not limited to, a circular shape, a triangular shape, a rectangular shape, an oval shape, and the like. One or more of the shapes may be selected and overlaid on the graphical map 300. The shape(s) may be sized and moved to a selected position on the graphical map 300. The interior of the shape(s) may define or specify the geographic location. In the example of FIG. 4, the shape 400 is circular. In alternate embodiments, the interface may enable the user to provide a custom shape, for example, by drawing it on a touch screen displaying the graphical map 300. In yet another embodiment, a shape may be automatically chosen, or a custom shape may be automatically generated, based on additional information available about the geographic location, such as, for instance, the shape of the building or venue at the geographic location. Some web services such as, for example, GOOGLE MAPS™, provide detailed shapes of buildings, which may be selected for specifying a shape of a geographic location.

The user of the mobile device 102 may also specify the contextual information for association with the specified geographic location. The contextual information may be, for example, but not limited to, one or more of text, video, audio, image data, and the like. In an example, the user may select the representation 400 of the geographic location and be presented with an interface for entering or otherwise selecting the contextual information. The contextual information may be stored in, for example, the data store 120 shown in FIG. 1 or any other suitable memory. After entering or selecting the contextual information, the contextual information may be associated with the geographic location represented by shape 400 in any suitable manner for associating data in a computing device.

One or more communication rules may be created or selected for managing communications received at the mobile device and that originated from the identified geographic location. The mobile device user may enter input for specifying one or more communication rules for association with data representing a geographic location. A communication rule may specify one or more steps or functions that are applied in response to the mobile device receiving a communication originating from the geographic location. A user may initiate creation or selection of a communication rule for a geographic location by selecting "Show Rules" button 206. In response to selection of the "Show Rules" button 206, the user may be provided with options for selecting or otherwise specifying a rule to be applied in response to receipt of communications originating from the geographic location. After selection of the rule, the rule is associated with data representing the geographic location. The rule may be saved by selection of the "Save Ruleset" button 208. In this way, geographic location is now "tagged" with the rule, meaning the rule can now be applied to incoming communications that originate from the specified geographic location.

Figure 5:
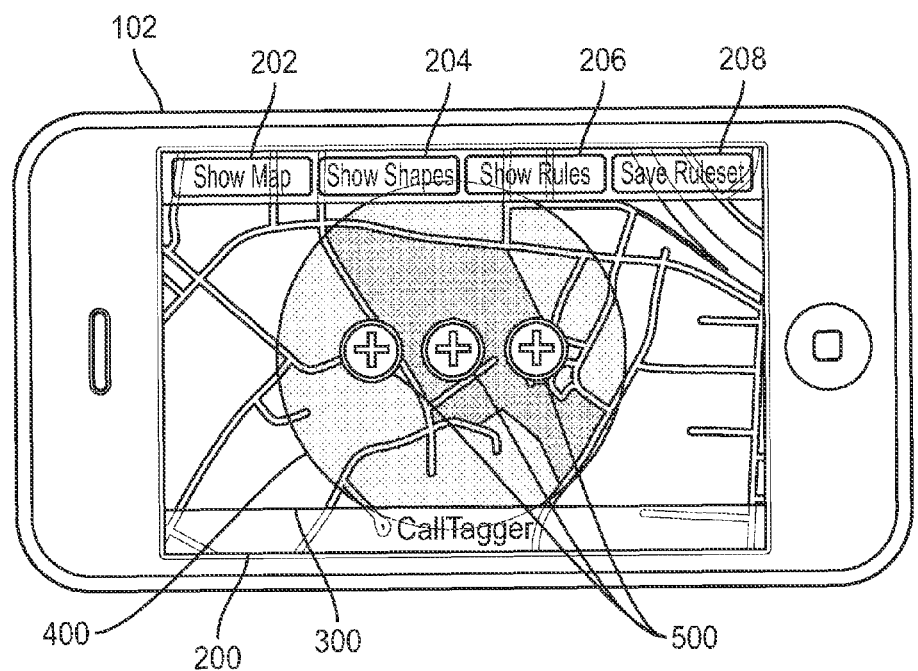
FIG. 5 is a front view of an exemplary mobile device with multiple icons being positioned on the geographic location representation in accordance with embodiments of the present disclosure.

Association of a communication rule with a geographic location may be indicated by placement of an icon or other suitable indicia on or near a graphical representation of the geographic location. For example, FIG. 5 illustrates a front view of the mobile device 102 with multiple icons 500 being positioned on the geographic location representation 400. Referring to FIG. 5, each of the icons 500 represents a communication rule associated with the geographic location. When a communication is received from the geographic location, the communication rules associated with the icons 500 will be applied. One or more of the icons 500 may be selected for editing, deleting, or otherwise modifying the communication rule associated with the respective icon.

In an example of a communication rule, the communication rule may specify that the contextual information is displayed or otherwise presented to the user in response to receiving a communication that originated from the geographic location. The contextual information may include, for example, but is not limited to, text, video, audio, image data, and/or the like. In an example, when a communication originating from the geographic location is received, the text, video, audio, image data, and/or the like may be presented to the mobile device user. The rule may also specify criteria, other than the geographic location, that must be met before presenting the contextual information to the user. For example, communication rule criteria may specify that the contextual information is presented only in response to determining that the communication is received within a predefined time period, which may be specified by the user. One or more criterion may be set for a rule and additional examples are described herein.

In another example of a communication rule, the communication rule may specify one or more modes of notifying the mobile device user of the communication. For example, a mode may be, but is not limited to, a ringer mode, a vibrate mode, a display mode, and the like. In the ringer mode, the mobile device may emit any suitable ringer sound, such as a prerecorded ring tone. In the vibrate mode, the mobile device may vibrate. In the display mode, the mobile device may display text, a graphic (e.g., an icon), or any other suitable notification indicator or indicia for indicating an incoming communication. A communication rule may specify that the user is notified using one or more of the modes in response to determining that the communication originated from the specified geographic location. The communication rule may specify any other additional criterion that must be met before notifying the user of the communication originating from the geographic location.

In another example of a communication rule, the communication rule may specify overriding an incoming communication restriction of the mobile device upon receipt of a communication originating from the geographic location. For example, a mobile device may be set with an incoming communication restriction specifying one of a plurality of modes. The communication restriction modes may include, but not be limited to, a high volume mode, a low volume mode, a vibrate mode, a phone only mode, an off mode, and the like. In the high volume mode, the mobile device may be set to ring at high volume in response to receiving a communication. In the low volume mode, the mobile device may be set to ring at low volume in response to receiving a communication. In the vibrate mode, the mobile device may be set to vibrate in response to receiving a communication. In the phone only mode, the mobile device may be set to ring only in response to receiving a telephone call. In the off mode, the mobile device may be set to only display text or other graphics in response to receiving a communication. Any of these incoming communication restrictions may be overridden in response to receiving a communication originating from the geographic location. The communication rule may override the restriction and notify the user of the communication in response to receiving the communication originating from the geographic location.

In another example of a communication rule, the communication rule may specify blocking communications originating from a geographic location. For example, in response to an incoming communication originating from a specified geographic location, the communication may be blocked. The user may specify the types of communications (e.g., emails, telephone calls, text messages, and the like) that are to be blocked. A log of the communication attempt may be recorded for later access by, and display to, the user.

In another example of a communication rule, the communication rule may specify notifying a user of a mobile device of a time when the user's mobile device was located at a geographic location in response to receiving a communication originating from the geographic location. For example, the mobile device may be configured to store data indicating a time when the user device was located at a geographic location. The time may be a current time that is stored when the mobile device determines that the mobile device is located at a geographic location. The time may be automatically stored when the device is located at the geographic location, or the user may select to store the current time when the device is located at the geographic location. In the alternative to the device being physically located at the geographic location, the user may specify the geographic location by entering coordinates or using a graphical map as described herein. Once the communication rule is specified and activated, the mobile device may notify the user of receipt of a communication and the stored time in response to receiving a communication originating from the geographic location.

In another example of a communication rule, the communication rule may specify accepting communications originating from a specified geographic location at a specified time. For example, the mobile device user may enter a time, which may be stored on the mobile device as a time for accepting calls originating from a geographic location. The communication rule may specify that a communication originating from the geographic location may be accepted only when the communication is received at the stored time. In addition, the mobile device may notify the user about the communication, such as, by a selected mode of notification (e.g., ringing, display of a graphic and/or text, and vibration). Communications originating from the geographic location and received outside of the stored time will be blocked. The rule may also specify criterion, other than the geographic location, that must be met before accepting the communication or notifying the user about the communication.

In another example of a communication rule, the communication rule may specify storing location-specific information while the mobile device is located at a user-specified geographic location, and associating the location-specific information to communications originating from the geographic location. For example, a mobile device user may interact with a graphical map displayed on the mobile device or otherwise enter data, as described herein, for indicating a geographic location. The user may then associate a communication rule with the geographic location that specifies that location-specific or contextual information received or identified while the mobile device is at the geographic location is to be stored. The communication rule may also specify that the stored location-specific or contextual information is presented to the user or the user is notified of the communication by a specified mode in response to receiving a communication originating from the geographic location. The contextual information may be one or more of text, video, audio, image data, and the like that is user-specified or generated by the mobile device.

After a communication rule is saved, the communication rule is enabled for application to incoming communications to the mobile device 102. The communication manager 106 may, for example, monitor incoming communications and compare the communications to enabled communication rules associated with or tagged to specified geographic locations. If the communication originated from a geographic location specified in a rule, the rule may be applied to the communication.

In addition to determining whether a communication originated from a geographic location, a communication rule may also determine whether one or more other criteria are met before taking action in response to receiving the communication even if the communication originated from a specified geographic location. For example, the rule may also require that the communication is received at a particular time. If the additional criterion is not met as specified by the rule, the rule will not be applied.

When a communication is received at the mobile device, the mobile device may determine whether the communication originated from a specified geographic location in accordance with embodiments of the present disclosure. The communication may include information identifying the geographic location from where the communication originated. Alternatively, one or more other communications may identify a geographic location from where a particular incoming communication originated. In association with a communication rule, the mobile device 102 may store data identifying a geographic location. When a communication is received, the mobile device 102 can determine whether the communication originated from the geographic location based on a comparison of the stored data identifying the geographic location and the received information identifying the geographic location from where the communication originated. In response to determining that the communication originated from the geographic location, the rule may be applied to the communication, such as, for example, by presenting contextual information to the user.

In an example of determining a geographic location from where a communication originated, a mobile device may be provided with geographic location information by subscribing to a service providing such information. For example, IP Multimedia Subsystem (IMS) provides a service for network wide publication and subscription of presence information. Users can subscribe to presence information for their contacts. If the contact accepts their request, the subscriber will be registered for presence notification. Whenever the friend publishes presence information, the IMS presence framework will notify the subscribed users of geographic location information. This information may be used for determining a geographic location from where an incoming communication originated.

In another example of determining a geographic location from where a communication originated, a social networking service may provide users with geographic location information of other users. Such services are available on the Internet. By use of a social networking service (e.g., FACEBOOK® social networking service provided by Facebook, Inc. of Cambridge, Mass.), users can add other users as friends and send them messages, and update their personal profiles to notify other users about themselves, such as their current geographic location. In this way, mobile device users can receive geographic location information of others, and may thereby determine the geographic location of the other users when receiving communications from the others.

In another example of determining a geographic location from where a communication originated, a user can utilize any suitable service that stores user's geographic location information. For example, FIRE EAGLE™ (available from Yahoo! Inc. of Santa Clara, Calif.) is a service that acts as a store for user's geographic location information. A user can authorize other services and applications to update or access this information via the Fire Eagle API, allowing a user to update their geographic location and then use it on any Fire Eagle enabled-website. In this way, mobile device users can receive geographic location information of others, and may thereby determine the geographic location of the other users when receiving communications from the others.

In yet another example of determining a geographic location from where a communication originated, a user's mobile device may include an application configured to determine a geographic location from where a received communication originated. In an example, the mobile device may include a yellow pages service application residing thereon that can determine a geographic location from where the communication originated.

In yet another example of determining a geographic location from where a communication originated, a reverse phone number lookup function may be implemented on a mobile device. Based on the phone number, the mobile device may determine or estimate a geographic location from a communication originated. In an example, the mobile device can use an area code of a phone number for determining an area from where the communication originated.

In accordance with other embodiments of the present disclosure, the system 100 shown in FIG. 1 may associate contextual information with a user-specified communication source, receive a communication originating from the user-specified communication source, and present the contextual information to a user in response to receiving the communication originating from the user-specified communication source. Referring now to FIG. 1, a user of the mobile device 102 may enter input that specifies the communication source and the contextual information. For example, the mobile device user may specify or otherwise identify the communication source by entering a telephone number, a caller identifier (e.g., a caller name), an email address, or the like for identifying a communication source. The user may also enter the contextual information, or the contextual information may be automatically generated data or data generated based on an incoming communication. Examples of contextual information include, but are not limited to, text, video data, audio data, image data, and combinations thereof. The specified contextual information and communication source information may be stored in the data store 120 of the mobile device 102.

The communication source and contextual information specified by the user may be a part of a communication rule residing on the mobile device that may be applied on receipt of communication from the specified source. In response to receiving a communication from the specified source, the contextual information may be presented to the user. For example, the mobile device may present the text, video data, audio data, image data, or combinations thereof to the user in response to receiving the communication from the specified source.

When a communication is received at the mobile device, the mobile device may compare the stored identifier for the communication source with an identifier contained in the communication. Based on the comparison, the mobile device 102 may determine that the communication is from the identified source. For example, the communication may contain a telephone number, a caller identifier, an email address, or another identifier of its source as will be understood by those of skill in the art. If the identifier contained in the communication exactly or closely matches the stored identifier, it may be determined that the communication is from the identified source. In response to determining that the communication originated from the identified source, the contextual information may be presented to the user.

Incoming communications may originate from a source, such as another mobile device 108 located at a geographic location 109. Communications from the other device may include, but are not limited to, telephone calls, email, text messages, instant messages, and the like.

Figure 6:
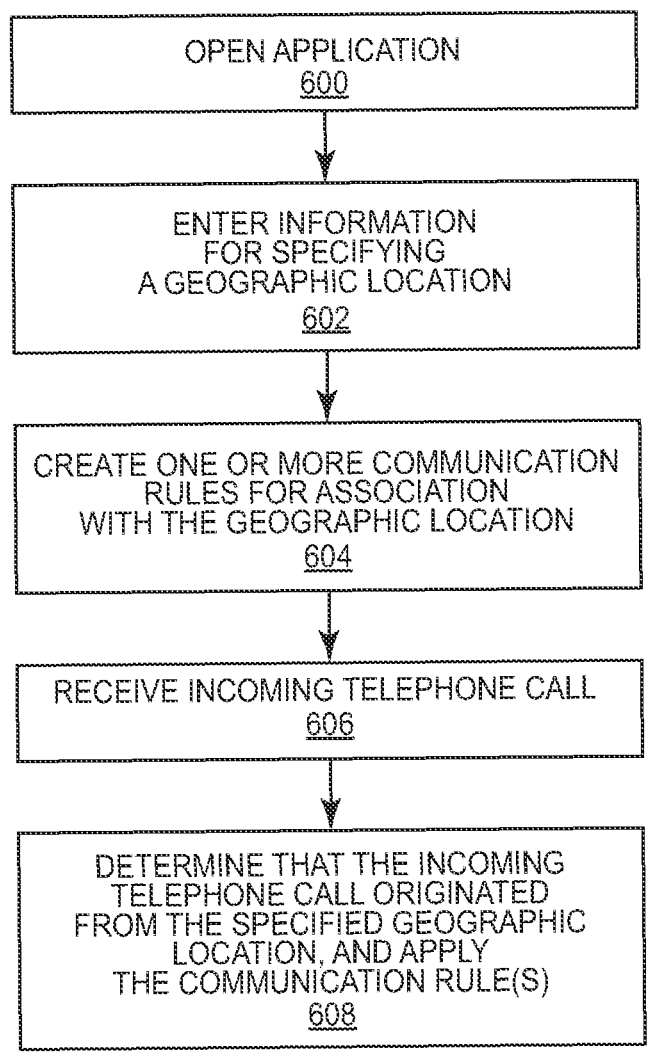
FIG. 6 is a flow chart of an exemplary method for a user to associate communication rules to incoming telephone calls originating from a geographic location in accordance with embodiments of the present disclosure.

FIG. 6 illustrates a flow chart of an exemplary method for a user to associate communication rules to incoming telephone calls originating from a geographic location in accordance with embodiments of the present disclosure. In this example, a user is expecting a telephone call from a hospital concerning the medical condition of a relative. In addition, the user has a deadline for an important project at work. As a result, the user does not want to be disturbed by non-urgent calls, and therefore, the user has set her mobile device to "vibrate" mode. However, the user would like to receive telephone calls that originate from the geographic location of the hospital or the surrounding area. Accordingly, referring to FIG. 6, the user opens an application residing on her mobile device to set rules for receiving communications originating from the hospital or surrounding area (step 600).

At step 602 of FIG. 6, the user may enter information for specifying a geographic location corresponding to the location of the hospital and its surrounding area. Since the user expects the telephone call concerning her relative's condition to originate from a clinic, a nurse's mobile telephone, or a relative's mobile telephone located in or around the hospital, she specifies the geographic location of the hospital and its surrounding area. To do so, for example, the mobile device may display a graphical representation of a map. The user may enter commands for displaying a representation of the geographic location of the hospital and its surrounding area. Next, the user may specify the geographic location in accordance with embodiments of the present disclosure. The geographic location may be specified, for example, by dragging and dropping one or more shapes (e.g., a circular shape) onto a representation of the hospital on the map and by appropriately resizing the shape(s) to cover all areas from where any important telephone calls are likely to originate. Alternatively, the user may enter commands for drawing one or more shapes to cover the areas.

At step 604 of FIG. 6, the user may enter commands for creating one or more communication rules for association with the specified geographic location. The user may set a rule for ensuring she receives multiple alerts or notifications about any incoming telephone calls originating from the specified geographic location. One exemplary rule may function as a reminder note by specifying that any incoming telephone calls originating from the specified geographic location will be prefaced with a reminder about her relative. For example, when an incoming telephone call is received that originated from the geographic location, the mobile device may display the text "Incoming Call from the Hospital". Another exemplary rule may specify that the mobile device rings but does not vibrate, when an incoming telephone call is received that originated from the geographic location. In another exemplary rule, the rule may direct the mobile device to send an accompanying text message and an email to her respective accounts that identify the time and a telephone number associated with an incoming telephone call originating from the specified geographic location. On the map, rules associated with the geographic location may be indicated by placement of "+" icons on the shape(s) corresponding to the geographic location.

At step 606 of FIG. 6, the mobile device receives an incoming telephone call that originated from the specified geographic location. For example, the user may be working when one or more calls are received on her mobile device from sources located at the geographic location. In this example, the incoming calls may be from nurses, doctors, and relatives at various locations throughout the hospital.

At step 608 of FIG. 6, the mobile device may determine that the incoming telephone call originated from the specified geographic location. In response, the mobile device may apply the communication rules associated with the geographic location. Similarly, the rules may be set for incoming communications other than telephone calls, such as, for example, emails, text messages, and the like. In this way, the user may be notified of the potentially important telephone calls or other communications originating from the hospital.

If the geographic location from where the call originated does not match the specified geographic location, the geographic location from where the call originated may be checked against other specified geographic locations and respective rule(s) applied if there is a match. If there is no match, then the incoming call may be processed as calls are normally processed by mobile devices, such as by directing the call to voicemail or by notifying the user of the call.

In accordance with embodiments of the present disclosure, a user may store voice messages for users originating communications from user-specified locations. In an example, the user may record and store a voice message on his or her mobile device or a remote server and associate the stored voice message with a geographic location. In response to receiving a communication originating from the geographic location, the voice message may be sent to the source of the communication. Alternative to a voice message, any other types of data (e.g., text messages) may be stored, and subsequently sent to a source of a communication originating from a specified geographic location.

Creating Location-Aware and Context-Aware Contact Entries

In various embodiments of the present disclosure, a system such as the system 100 shown in FIG. 1, may be used for creating location-aware and context-aware contact entries. For example, the contact entries may be elements of an address book as will be understood to those of skill in the art. The address book and its contact entries may be stored in, for example, the date store 120 shown in FIG. 1. A contact entry may include, but is not limited to, a name, physical address, telephone numbers, email addresses, the like, and combinations thereof for an entity, such as, but not limited to, a person and a business. Embodiments of the present disclosure may enable a user to identify a geographic location, to receive at the mobile device a communication including identification information and originating from the geographic location, and to associate the identification information with a contact entry.

Figure 7:
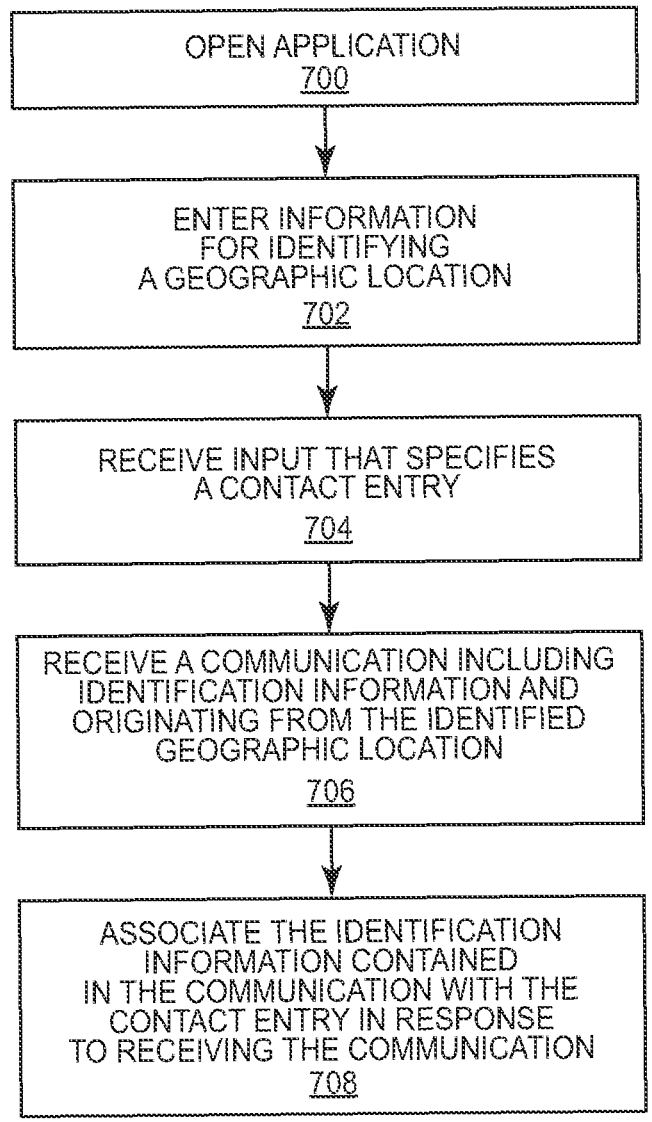
FIG. 7 is a flow chart of an exemplary method for associating identification information with a contact entry based on receipt of a communication including the identification information and originating from a particular geographic location according to embodiments of the present disclosure.

FIG. 7 illustrates a flow chart of an exemplary method for associating identification information with a contact entry based on receipt of a communication including the identification information and originating from a particular geographic location according to embodiments of the present disclosure. The method may be implemented by an application residing on, for example, the mobile device 102 shown in FIG. 1. Referring to FIG. 7, the user opens the application (step 700). At step 702 of FIG. 7, the mobile device may receive user-entered information for identifying or otherwise specifying a geographic location in accordance with embodiments of the presently disclosed subject matter. For example, the mobile device 102 may display a graphical map including a representation of the geographic location, and the user may then enter input to select the geographic location. In an example, the geographic location may be defined by a route on the map.

At step 704 of FIG. 7, the mobile device may receive user input that specifies a contact entry. For example, the application may open an address book containing the contact entry for selection of the contact entry by the user. The selected contact entry is the entry that the user would like to associate with communications originating from the specified geographic location. For example, the user may know or expect that incoming communications originating from the geographic location should be associated with the selected contact entry.

At step 706 of FIG. 7, the mobile device may receive a communication including identification information and originating from the identified geographic location. For example, the mobile device may receive a telephone call or any other communication as described herein. The communication may include, for example, but is not limited to, one or more of a name, an address, a telephone number, and an email address. The identification information may be, for example, but not limited to, one or more of a name, a physical address, a telephone number, and an email address.

At step 708 of FIG. 7, the identification information contained in the communication is associated with the contact entry in response to receiving the communication. For example, the name, physical address, telephone number, email address, or other information contained in the communication may be added to the contact entry in response to determining that the communication originated from the user-specified geographic location. In this way, the identification information contained in the communication can be associated with the contact entry upon determining that the communication originated from the user-specified geographic information.

The association of the identification information with the contact entry may be automatically implemented by the mobile device in one or more embodiments of the present disclosure. In alternative embodiments, the mobile device may first notify the user about the communication and present the contact entry to the user for suggesting that the identification information be associated with the contact entry. If desired, the user may then input commands for assigning the identification information to the contact entry, such as, for example, by selecting a displayed button, icon, or other indicia.

In accordance with embodiments of the present disclosure, a user may specify communication rules for managing one or more contact entries in response to communications originating from a geographic location. In an example of a communication rule, the communication rule may specify that the identification information contained in a communication may only be associated with the communication if the communication is received at a user-specified specified time. In the communication rule example, the user may enter a time and the time is stored with the communication rule. If a communication is received at the user-specified specified time, the identification information may be associated with the contact entry.

In accordance with embodiments of the present disclosure, a user may specify a threshold number of calls before which identification information is associated with a contact entry. For example, the user may specify that three calls must be received before identification information is associated with a contact entry. This rule may be used in combination with one or more other rules described herein.

Figure 8:
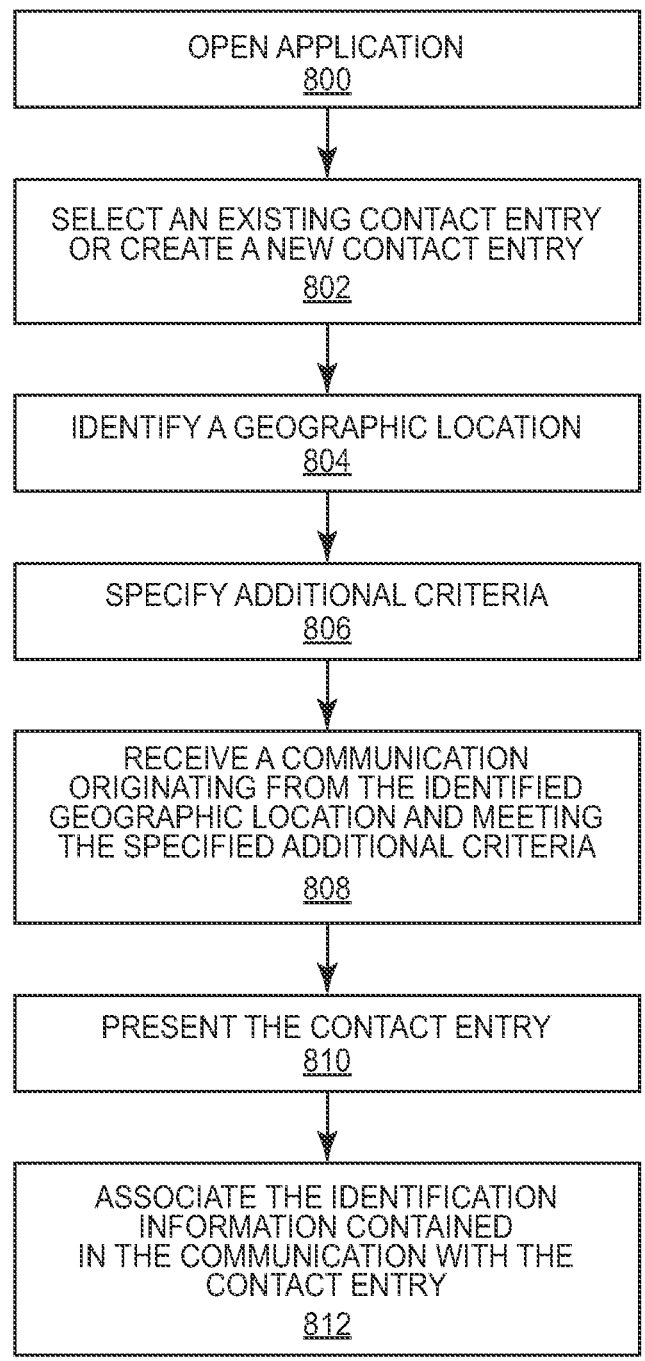
FIG. 8 is a flow chart of an exemplary method for managing a contact entry in response to receiving a communication originating from a geographic location according to embodiments of the present disclosure.

FIG. 8 illustrates a flow chart of an exemplary method for managing a contact entry in response to receiving a communication originating from a geographic location according to embodiments of the present disclosure. The method may be implemented by an application residing on, for example, the mobile device 102 shown in FIG. 1. Referring to FIG. 8, the user opens the application (step 800). At step 802, using the application, the user may select an existing contact entry or create a new contact entry in an address book. For example, the user may be expecting a call or other communication from another person. There may already be an existing contact entry for the other person. If not, the user may select to create a new contact entry for the other person.

In step 804 of FIG. 8, the user may enter data for identifying a geographic location. For example, the user may select a representation of a geographic location on a graphical map for identifying a geographic location. The geographic location may be an area from where a communication is expected to originate from the other person. For example, the user may know that the other person works at the identified geographic location but does not know the person's telephone number at the geographic location. In this example, the user can expect that calls or other communications received from the geographic location are from the other person.

The user may further specify additional criterion for communications originating from the geographic location (step 806). For example, the user may specify the time a communication may be expected. Using the aforementioned example of an incoming communication from another person at a work location, a communication from another person's work may be expected between 8:00 a.m. and 5:00 p.m. during the weekdays. The user may specify these times or other criterion for the communication rule.

After identification of the geographic location and selection or creation of a contact entry, the rule may be set and specifies that incoming communications originating from the geographic location will be associated with the contact entry. For example, in step 808 of FIG. 8, a communication may be received from the geographic location that meets the specified additional criterion. In response to receiving the communication, the selected contact entry may be presented to the user (step 810). For example, an address book residing on a mobile device may be opened, and the contact entry presented to the user. Further, the user may be notified of the communication regardless of notification settings on the mobile device.

In step 812 of FIG. 8, the identification information contained in the communication may be associated with the contact entry in response to receiving the communication. For example, when the contact entry is presented to the user, the user may enter data, such as text data or other suitable data types, into the contact entry. In another example, information, such as identification information (e.g., a telephone number or email address identifying an originating source of the communication), may be automatically entered into the contact entry. Rather than automatic entry of the identification information, a user may be prompted to enter such information into the contact entry.

In one example, when the contact entry is presented to the user in response to receipt of a communication, the mobile device may provide an option for the user to enter information for naming the geographic location from where the communication originated. In response of receipt of the user input naming the geographic location, the name may be assigned to the contact entry. Further, for example, the name may be associated with information, such as identification information, contained in the communication.

In another example of a communication rule, identification criterion for identifying a source of a communication may be used for associating identification information with a contact entry. For example, the user may enter or otherwise specify the identification criterion. A mobile device, for example, may determine whether identification information contained in a received communication meets the identification criterion. The communication rule may specify that the identification information is associated with the contact entry only in response to determining that the identification information meets the identification criterion. The identification information may include, but is not limited to, criteria for identifying voice data, a name, a physical address, a telephone number, a caller identifier, and an email address. The identification criteria may be stored in a mobile device. The communication rule may specify any other additional criteria that must be met before associating the identification information with the contact entry.

In another example of a communication rule, the rule may specify that the user is prompted with options for naming a geographic location in response to receiving communications originating from the geographic location and when the communication contains information associated with a contact entry. For example, a contact entry may include a telephone number. When a communication is received from the telephone number, the user may be presented a geographic location from where the communication originated, for example as an address or a graphical map. The user may be prompted to associate the geographic location with the contact entry and, optionally, to assign a name to the geographic location. For example, the mobile device may display the user's name stored in the contact entry, and provide the user with an option to set the caller's location as "HOME", "WORK", or enter a name. The user may then select one of the options. As a result, the mobile device may update the contact entry to include the caller's current geographic location as the selected name. Multiple such geographic locations may be associated with an individual contact entry.

In another example of a communication rule, a user may assign a name and/or category to a geographic location, and a mobile device may prompt a user to associate the name and/or category to a contact entry on receipt of communications originating from the geographic location. For example, a user may assign a category in text data format such as, but not limited to, "HOME" or "WORK" to a geographic location selected on a displayed graphical map. On receipt of a communication originating from the geographic location, the mobile device may prompt the user to select to associate the name and/or category to a contact entry. For example, the mobile device may display a text prompt such as "Set caller's location as HOME". On selection of the name or category, the contact entry will be associated with the name or category. Alternatively, the user may be allowed to enter a name or category on receipt of the communication.

In various other embodiments of the present disclosure, a contact entry may be presented to a user based on information contained in an incoming communication and/or a context of receiving the communication. For example, a communication rule may specify presenting a contact entry to the user based on a communication source identifier contained in the incoming communication. In another example, a communication rule may specify presenting a contact entry to the user based on voice data contained in an incoming communication.

Figure 9:
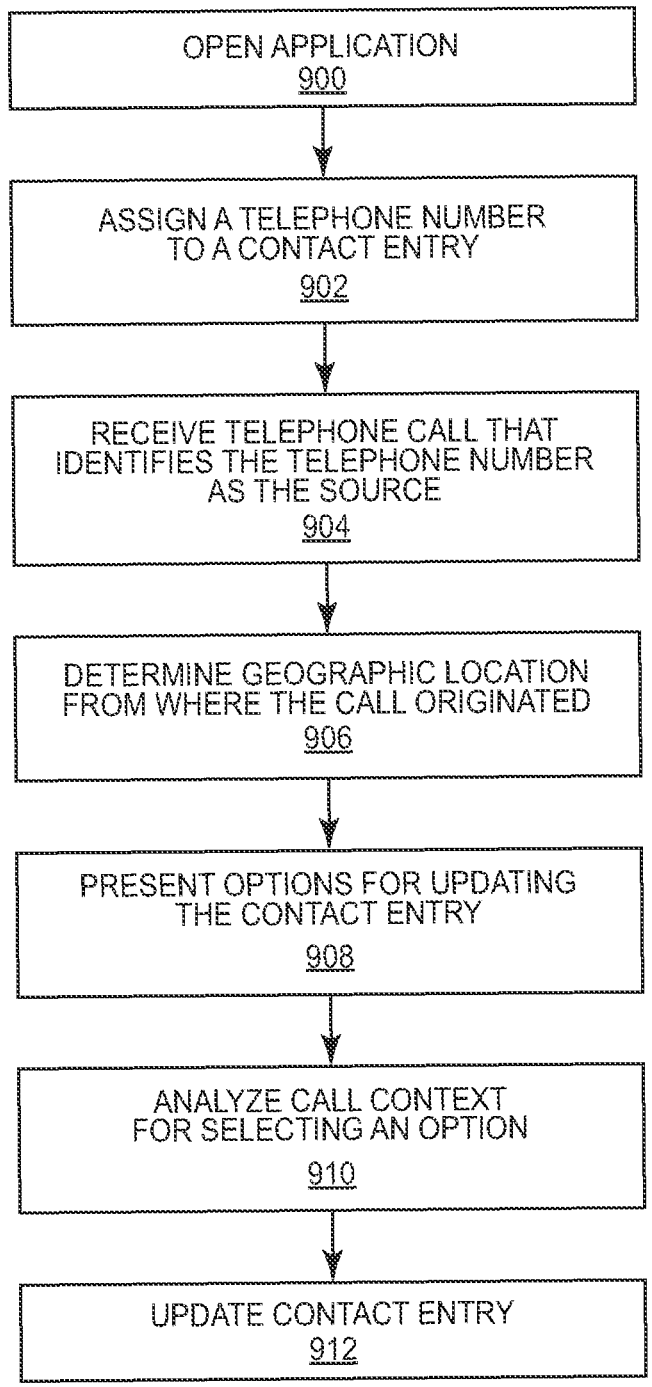
FIG. 9 is a flow chart of an exemplary method for presenting a contact entry to a user based on information contained in an incoming communication and/or a context of receiving the communication according to embodiments of the present disclosure.

FIG. 9 illustrates a flow chart of an exemplary method for presenting a contact entry to a user based on information contained in an incoming communication and/or a context of receiving the communication. The method may be implemented by an application residing on, for example, the mobile device 102 shown in FIG. 1. Referring to FIG. 9, the user opens the application (step 900). At step 902, a telephone number for another user is assigned to a contact entry. Any other source identifier for a communication may be assigned to the contact entry.

At step 904 of FIG. 9, the user's mobile phone may receive a telephone call that identifies the telephone number as the source. The application may use the telephone number for associating the call with the contact entry. In another example, the communication may include any other source identifier, such as an email address, which may be used to associate the communication with a contact entry.

At step 906 of FIG. 9, a geographic location from where the call originated may be determined. For example, the caller may have included his or her current location as part of the call set-up parameters such that the communication includes information for identifying the geographic location. Alternatively, identification of the geographic location may be provided in any other suitable manner. For example, a service such as FIRE EAGLE™ may store a user's geographic location information and provide it to users.

In response to receiving information identifying the geographic location, the mobile device may present some options for updating the contact entry associated with the telephone number (step 908). For example, on receipt of a communication originating from the geographic location, the mobile device may prompt the user to select to associate a name and/or category to a contact entry. For example, the mobile device may display a text prompt such as "Set caller's location as HOME". On selection of the name or category, the contact entry will be associated with the name or category. Alternatively, the user may be allowed to enter a name or category on receipt of the communication.

In another example, the user may be provided with an option to associate the geographic location with the contact entry. The contact entry may include an indicator for indicating the geographic location on a graphical map. A user may be provided with an option to enter a name for the geographic location. The user input naming the geographic location may also be associated with the contact entry.

If the user does not select a name or category, the application may analyze one or both of a context of the call and contents of the call for selecting an option (step 910). For example, a context of the call for selecting an option or reducing the number of options presented to the user. The communication may include information related to one or more of the options. For example, the caller may say "I'm calling from work." Based on this voice data such as by use of speech-to-text conversion and semantic analysis, the word "work" may be isolated. By this analysis, the application may determine that the call originated from a work location and, in response to the determination, present only the option "WORK" to the user. The user may then accept or decline to associate the text "WORK" with the geographic location from where the call originated. The geographic location of the call may be automatically associated with the call based on the analysis.

In response to acceptance of the option, the contact entry may be updated accordingly (step 912). For example, the word "WORK" may be associated with the telephone number in the contact entry. In this way, future calls from the telephone number or geographic location may be identified as "WORK".

In accordance with embodiments of the present disclosure, a contact entry or group of contact entries may be presented to a user in response to receiving a communication including a source identifier. For example, a user may use an application residing on a mobile device to create a group in an address book and to enter a name for the group. For example, the group may be named "CAR DEALERS". The group may include no contact entries or one or more contact entries. After creation of the group, the mobile device may receive a communication (e.g., a telephone call) including a source identifier. The source identifier may indicate that the communication originated from a particular car dealership. The application may determine based on the matching text, that the "CAR DEALERS" group is the closest match among a plurality of groups and, in response, present the group to the user (e.g., display indicia of the group to the user). In an example of matching, the application may use communication information from the caller to traverse mapped nodes from existing contacts or groups in an address book. The user may then select to automatically select (e.g., one click selection) the group for entry of information associated with the communication into the group. For example, a contact entry in the group may be selected or created. The contact entry may be populated with the communication information such as, but not limited to, the dealer contact name, telephone number, geographic location information, the like, and combinations thereof.

In embodiments of the present disclosure, an ontology may be queried or traversed using information contained in a received communication for locating nodes having mappable relationships. For example, a call may include the text "TOYOTA DEALER" for identifying the caller. This identification may be used for mapping to a "CAR DEALERS" group of contacts. In this example, the mobile device may analyze the text "TOYOTA DEALER" and determine that this text means that the call originated from a car dealer. The word "DEALER" may be the key word used for mapping, because it is an exact match between the text in the call and an identifier for the contact group. The mobile device may also be configured to determine best matching, i.e., a match may be made if words are similar but not exact.

In embodiments of the present disclosure, an address of a geographic location from where a communication is received may be determined based on contents of the communication. For example, an incoming email may include a residential or business address. In response to receiving the incoming email, an application may analyze the contents of the email and associate the address with a contact entry based on the address. The application may recognize a street address, a city/state, zip code, or the like contained within the email. In addition, speech recognition may be applied for determining that a caller is referencing an address in a call, for example.

Figure 10:
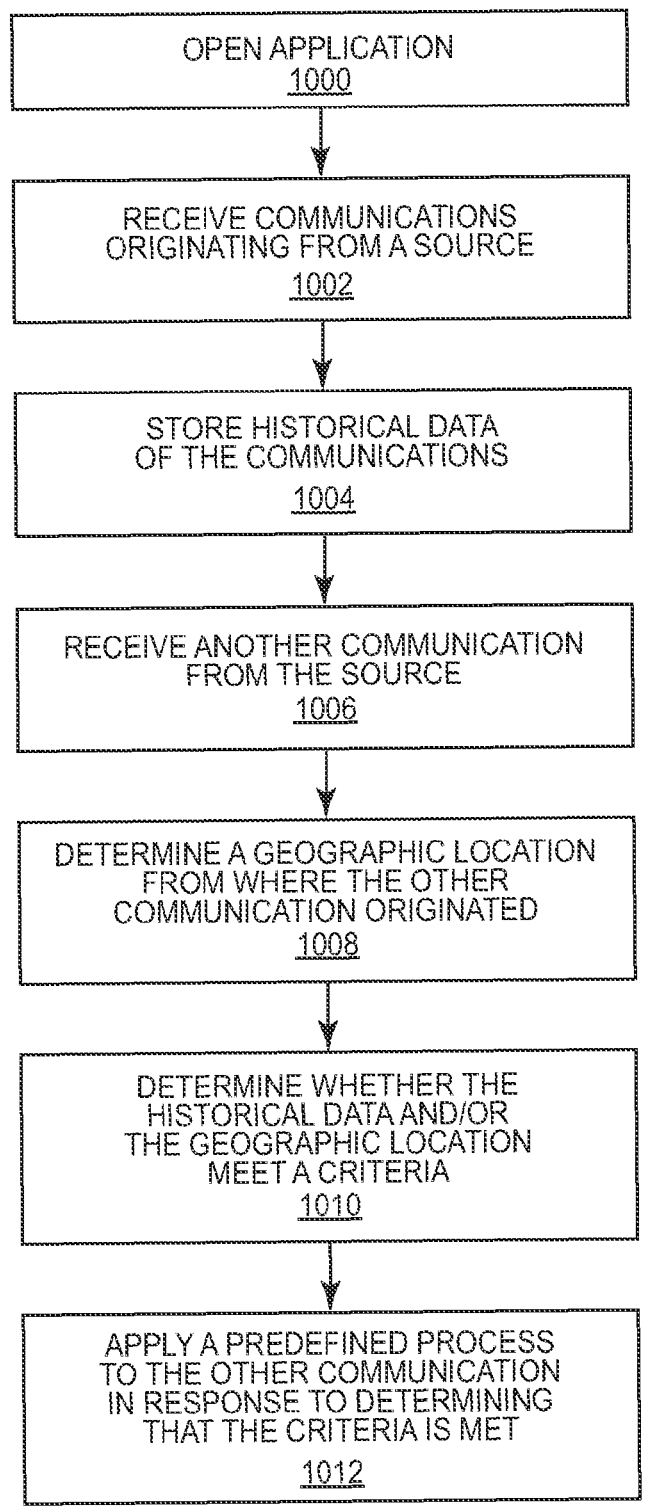
FIG. 10 is a flow chart of an exemplary method for applying a process to a communication originating from a source based on historical data and a geographic location from where the communication originated according to embodiments of the present disclosure.

In various other embodiments of the present disclosure, historical data of communications originating from a source may be used for applying one or more processes to subsequently-received communications originating from the source and a geographic location. FIG. 10 illustrates a flow chart of an exemplary method for applying a process to a communication originating from a source based on historical data and a geographic location from where the communication originated. The method may be implemented by an application residing on, for example, the mobile device 102 shown in FIG. 1. Referring to FIG. 10, the user opens the application (step 1000).

At step 1002 of FIG. 10, the mobile device may receive communications originating from a source. The communications may be received over a period of time from the same source.

At step 1004 of FIG. 10, the mobile device may store historical data of communications originating from a source. For example, as each communication in step 1002 is received, the mobile device may extract information contained in the communications and generate or record data based on a context of the communications for use in creating and maintaining historical data related to the communications. The stored historical data may include, but is not limited to, data representing a number of different communications (e.g., calls, emails, or the like) received from a source (e.g., a mobile telephone, computer, email account, and the like). In another example, the stored historical data may include the times of receipt of the communications at the mobile device. In yet another example, the stored historical data may include geographic location information indicating from where the communications originated. The historical data may be used for profiling or characterizing communications from the source.

At step 1006 of FIG. 10, the mobile device may receive another communication from the source. In response to receiving the communication, the mobile device may determine a geographic location from where the communication in step 1006 originated (step 1008).

At step 1010, the mobile device may determine whether the historical data and/or the geographic location meet a criterion. In response to determining that the criterion is met, the mobile device may apply a predefined process to the communication originating from the source located at the geographic location (step 1012). For example, the mobile device may maintain historical data indicating a number of times that communications from the source originated from the geographic location. When another communication is received from the source, the mobile device may determine whether the number of times communications received from the source meets a threshold number. In response to determining that the threshold number is met, the mobile device may associate the source with a contact entry. For example, the mobile device may automatically create a contact entry for the source and populate the entry with information extracted from the communications from the source, or prompt the user to create the entry.

In another example relating to FIG. 10, the historical data may indicate a time of receipt of the communications. If the predefined criterion is met, the mobile device may automatically notify the user of the time of receipt of each communication. For example, the mobile device may display a listing of each communication and a time that each was received.

In another example relating to FIG. 10, the mobile device may determine a name associated with the geographic location based on a contact entry associated with the source. In response to receiving the communication, the mobile device may present the name to the user. For example, the mobile device may determine a source identifier on receipt of a communication from the source. The source identifier may be used by the mobile device to find the contact entry. The contact entry may include a name of the geographic location from where the communication originated. The name in the contact entry may be displayed to the user in response to receiving the communication.

Figure 11:
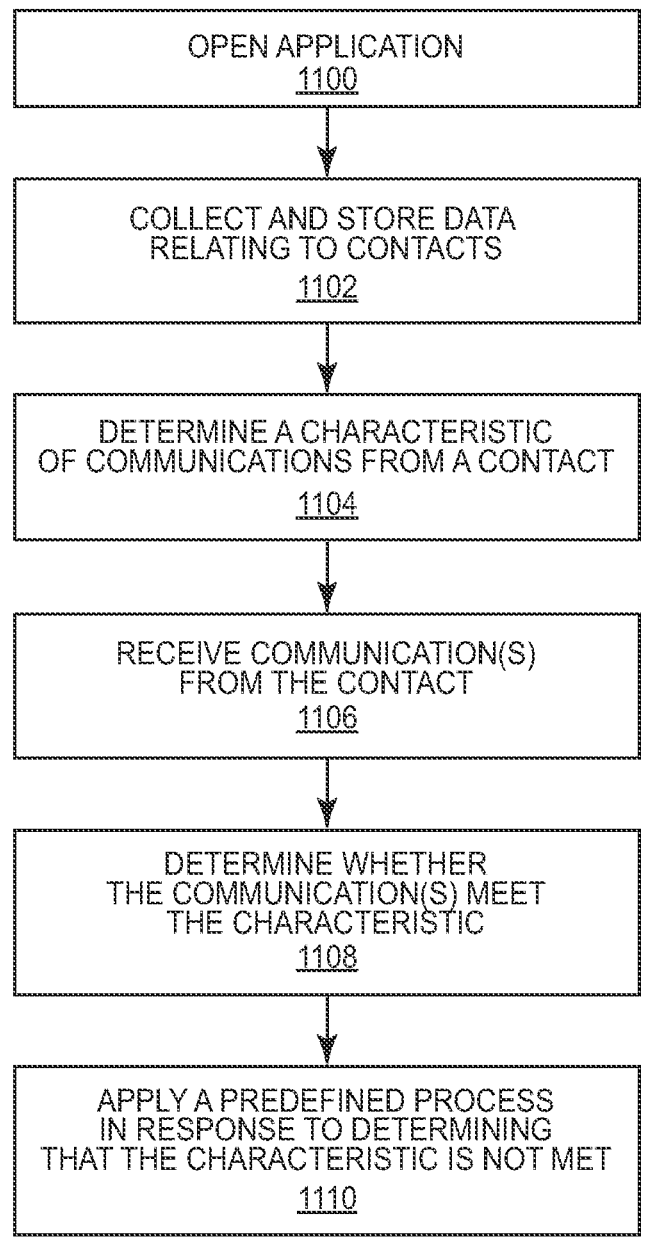
FIG. 11 is a flow chart of another exemplary method for applying a process to a communication originating from a source based on historical data and a geographic location from where the communication originated according to embodiments of the present disclosure.

FIG. 11 illustrates a flow chart of another exemplary method for applying a process to a communication originating from a source based on historical data and a geographic location from where the communication originated. The method may be implemented by an application residing on, for example, the mobile device 102 shown in FIG. 1. Referring to FIG. 11, the user opens the application (step 1100).

At step 1102, the application may actively collect data relating to the user's contacts stored as contact entries in an address book. For example, the mobile device may receive communications from sources associated with the user's contacts, and store the information as historical data. The data may include, for example, but is not limited to, a statistic (e.g., an average) of the numbers of communications (e.g., calls) received from a contact, a time of the communications, a geographic location from where the communications originated, the like, and combinations thereof. In an example, a user may receive an average of three calls per week between 1:00 p.m. and 3:00 p.m. from a work location (e.g., an office located in the downtown area of a city) of one of the user's contacts. Work location information, such as data relating to its geographic location, may be stored in the contact entry for the contact. The work location information (e.g., a name for the work location of the contact) may be displayed to the user each time a communication is received from that geographic location.

At step 1104 of FIG. 11, the application may determine a characteristic of communications from a contact. For example, the application may use the historical data for a contact to determine a characteristic of communications from the contact. Continuing the aforementioned example, the application may analyze the communication of the contact and recognize that calls from the contact can be expected between the hours of 1:00 p.m. and 3:00 p.m. from the work location. The application may store, as historical data for the contact, that calls from the contact are expected between these hours. In response to receiving an incoming call from this contact that originate at the geographic location, the application may display, for example, text indicating the name of the contact and that the call is from "WORK".

At step 1106 of FIG. 11, one or more other communications from the contact are received. The application may analyze the communication and determine whether the communication(s) meet the characteristic (step 1108). Continuing the aforementioned example, employment of the contact may change and, as a result, the contact may move to a different work location such that expected communications from the contact between the hours of 1:00 p.m. and 3:00 p.m. originate from a different geographic location (i.e., the new work location for the contact). The application may recognize that the communications now originate from the new work location. In this way, the application recognizes a trend in communications from the contact by comparing new communications from the contact with historical data for the contact.

At step 1110 of FIG. 11, the application applies a predefined process in response to determining that the characteristic is not met. This predefined process may include, but is not limited to, notifying a user about receipt of the communication originating from the new geographic location, and updating a contact entry with a name of the geographic location associated with the new communication(s). In another example, the predefined process may include determining a confidence level for updating a contact entry with a name of a geographic location from where the communication originated, and notifying a user of the confidence level.

Continuing the aforementioned example for step 1110, if it is determined that the expected communications between the hours of 1:00 p.m. and 3:00 p.m. did not originate from the expected geographic location, the application may apply a predefined process. In an example of a predefined process, the geographic location associated with the newly received calls may be detected and referenced in a geographic information system database for discovering the address of the detected location. The geographic information system database may provide a name, type, address, the like, and combinations thereof of a business that is currently listed as being located at the new geographic location from where the calls originated. When the number of calls from this new geographic location meets a threshold number, the application may notify the user that the calls are being received from the new geographic location. For example, the mobile device may display text about the new geographic location such as, for example, a name and address of the business at the geographic location. The mobile device may also indicate that the application has determined that the address and business associated with the current communication or most recent communication may be the contact's new work business name and address. The application may also indicate a confidence level that the business and address is the contact's new work business name and address. The application may provide the user with an option to update the contact entry with the new work business name and address. The user may then select to update the contact entry in accordance with the suggested business name and address.

The various techniques described herein may be implemented with hardware or software or, where appropriate, with a combination of both. For example, the mobile device 102 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A system comprising:
    a mobile computing device comprising:
        a display; and
        a processor of configured to:
        determine that the mobile computing device is located at a geographic location;
        associate contextual information with the geographic location in response to determining that the mobile computing device is located at the geographic location;
        receive a selection of a representation of the geographic location on a graphical map on the display;
        receive a communication originating from the geographic location; and
        present the contextual information in response to receiving the communication,
        wherein the contextual information is captured at the geographic location.

2. The system of claim 1 wherein the contextual information is video data.

3. The system of claim 1 wherein the contextual information is audio data.

4. The system of claim 1 wherein contextual information is text.

5. The system of claim 1 wherein the contextual information is image data.

6. The system of claim 1 wherein the representation is a circular shape.

7. The system of claim 1 wherein the representation is a custom shape.

8. The system of claim 1 wherein the representation is a plurality of shapes overlaid on the graphical map.

9. The system of claim 1 further comprising a communication interface configured to process 4G wireless signals received via an antenna.

10. The system of claim 1 wherein a plurality of communication rules are stored in the system and which specify functions of the system in response to the receipt of the communication.

11. The system of claim 1 wherein association of a communication rule with a geographic location is indicated by an indicia near the representation of the geographic location on the graphical map on the display.

12. The system of claim 1 wherein the processor is further configured to present the contextual information only within a predetermined time period as specified by a stored communication rule.

13. The system of claim 1 wherein the processor is further configured to present notification of the communication according to a stored communication rule that specifies a mode of presenting the notification of the communication.

14. The system of claim 1 wherein the processor is further configured to override an incoming communication restriction upon receipt of the communication from the geographic location as specified by a stored communication rule.

15. The system of claim 1 wherein the processor is further configured to block communications originating from the geographic location as specified by a stored communication rule.

16. The system of claim 1 wherein the processor is further configured to present a notification captured when located at the geographic location in response to receiving the communication from the geographic location as specified by a stored communication rule.

17. The system of claim 1 wherein the representation is capable of being created through a drag and drop operation on the graphical map on the display.

18. The system of claim 1 wherein the processor is further configured to send a text identifying a time and telephone number associated with the communication as specified by a stored communication rule.

19. The system of claim 1 wherein the processor is further configured to send an email identifying a time and telephone number associated with the communication as specified by a stored communication rule.

20. The system of claim 1 wherein the processor is further configured to send a voicemail to a source of the communication as specified by a stored communication rule.

21. The system of claim 1 wherein the processor is further configured to send a text to a source of the communication as specified by a stored communication rule.

22. The system of claim 1 further comprising:
    storage including historical data of a plurality of communications originating from the geographic location,
    wherein the processor is further configured to use the hierarchical data as criteria in applying at least one process to the communication.

23. The system of claim 22 wherein the at least one process includes updating a contact entry.

24. The system of claim 22 wherein the at least one process includes providing a notification of a confidence level for updating a contact entry.

25. The system of claim 1 wherein the display is configured to be depressed to select icons presented on the display.

26. The system of claim 1 further comprising a keypad, wherein the processor is further configured to effect presentation of icons on the display and enable selection of the icons via the keypad.

27. The system of claim 1 wherein the representation is an automatically generated custom shape.

* * * * *